US012776099B2

(12) United States Patent
Cumpson

(10) Patent No.: US 12,776,099 B2
(45) Date of Patent: Oct. 27, 2026

(54) SYSTEM AND METHOD FOR ANALYSIS OF SPECIMENS

(71) Applicant: Peter Cumpson, Sydney (AU)

(72) Inventor: Peter Cumpson, Sydney (AU)

( * ) Notice: Subject to any disclaimer, the term of this patent is extended or adjusted under 35 U.S.C. 154(b) by 155 days.

(21) Appl. No.: 18/862,164

(22) PCT Filed: Apr. 30, 2023

(86) PCT No.: PCT/AU2023/050358
§ 371 (c)(1),
(2) Date: Oct. 31, 2024

(87) PCT Pub. No.: WO2023/212770
PCT Pub. Date: Nov. 9, 2023

(65) Prior Publication Data

US 2025/0272913 A1 Aug. 28, 2025

(30) Foreign Application Priority Data

May 4, 2022 (AU) ................................ 2022901177
Apr. 2, 2023 (AU) ................................ 2023900936

(51) Int. Cl.
*G06T 17/00* (2006.01)
*G01N 35/00* (2006.01)
(Continued)

(52) U.S. Cl.
CPC ....... *G06T 17/00* (2013.01); *G01N 35/00732* (2013.01); *G06T 7/73* (2017.01);
(Continued)

(58) Field of Classification Search
CPC ........... G06T 17/00; G06T 19/00; G06T 7/73; G01N 35/00732
(Continued)

(56) References Cited

U.S. PATENT DOCUMENTS 11,164,289 B1 * 11/2021 Yang ...................... G06N 20/00
12,474,241 B2 * 11/2025 Chang ...................... G01N 1/30
(Continued)

FOREIGN PATENT DOCUMENTS

JP H0544007 A 2/1993
JP H10172494 A 6/1998
(Continued)

OTHER PUBLICATIONS

International Search Report and Written Opinion for corresponding PCT Application No. PCT/AU2023/050358, dated Aug. 11, 2023, 9 pgs.

(Continued)

*Primary Examiner* — Thomas J Lett
(74) *Attorney, Agent, or Firm* — Kinney & Lange, P.A.

(57) ABSTRACT

A new method and apparatus is described for the improved analysis (physical or chemical) of objects. Photogrammetry and computer-readable fiducial markers are used to produce electronic files that constitute a digital twin of the specimen being analyzed. This aids communication and discussion about where on the specimen to analyze, and allows multiple analytical techniques to be applied using a common coordinate system, thereby aiding correlative microscopy. Additionally, a method and software which we call PARS (Portable Analytical Registration Software) that allows points defined by one computer-operated imaging instrument to be found easily in another computer-operated imaging instrument, without needing access or changes to the software running each instrument. This methodology makes it possible to correlate images from many surface imaging techniques to provide an unprecedented level of surface detail on a potentially nanometer scale that no one technique can provide alone.

20 Claims, 25 Drawing Sheets

(51) Int. Cl.
*G06T 7/73* (2017.01)
*G06T 19/00* (2011.01)

(52) U.S. Cl.
CPC .... *G06T 19/00* (2013.01); *G01N 2035/00752* (2013.01); *G06T 2207/20092* (2013.01); *G06T 2207/30204* (2013.01); *G06T 2219/004* (2013.01)

(58) Field of Classification Search
USPC .......................................................... 345/419
See application file for complete search history.

(56) References Cited

U.S. PATENT DOCUMENTS

| | | | | |
|---|---|---|---|---|
| 2018/0137646 | A1* | 5/2018 | Kraszewski | G06T 7/73 |
| 2019/0348253 | A1 | 11/2019 | Konyuba et al. | |

FOREIGN PATENT DOCUMENTS

| | | | |
|---|---|---|---|
| JP | 2008058154 | A | 3/2008 |
| JP | 2008537300 | A | 9/2008 |
| JP | 2011086886 | A | 4/2011 |
| JP | 5775606 | B2 | 7/2015 |
| JP | 2019200126 | A | 11/2019 |
| JP | 2021056232 | A | 4/2021 |

OTHER PUBLICATIONS

Sheriff, J. , et al., "Computer-readable Image Markers for Automated Registration in Correlative Microscopy—"autoCRIM"", J.Sheriff et al., 'Computer-readable Image Markers for Automated Registration in Correlative Microscopy—"autoCRIM"', Ultramicroscopy, vol. 228, pp. 1-12, Sep. 2021. Retrieved from: https://doi.org/10.1016/j.ultramic.2021.113322.
Zhang, Zhuming , et al., "Deep Tag: A General Framework for Fiducial Marker Design and Detection", Zhuming Zhang et al., 'Deep Tag: A General Framework for Fiducial Marker Design and Detection', arXiv:2105.13731v1, pp. 1-13, May 28, 2021. Retrieved from: <URL: https://arxiv.org/pdf/2105.13731v1.pdf>.
AprilTag, April Robotics Labratory, Project AprilTags Visual Fiducial System, 2010, 6 pgs.
Bernhard Strobel et al., "An automated device for the digitization and 3D modelling of insects, combining extended-depth-of-field and all-side multi-view imaging," ZooKeys 759: 1-27 (2018), 28 pgs.
Edwin Olson, "AprilTag: A robust and flexible visual fiducial system", 8 pgs.
Fabian Plum and David Labonte, "scAnt—an open-source platform for the creation of 3D models of arthropods (and other small objects)," PeerJ, Apr. 12, 2021, 29 pgs.
Filippo Bergamasco et al., "Image-Space Marker Detection and Recognition using Projective Invariants", 9 pgs.
Harold, Elliotte Rusty and Means, Scott, "XML in a Nutshell A Desktop Quick Reference", Dec. 1, 2000, 15 pgs.
J.J.H.A. Van Hest et al., "Towards robust and versatile single nanoparticle fiducial markers for correlative light and electron microscopy," Journal ofMicroscopy, vol. 274, Issue 1 2019, pp. 13-22.
Japanese Notice of Reasons for Refusal dated Jun. 27, 2025, for corresponding Japanese Patent Application No. 2024514500, 11 pgs.
Jeffrey Caplan, et al., "The Power of Correlative Microscopy: Multi-modal, Multi-scale, Multi-dimensional", Curr Opin Struct Biol. Oct. 2011 ; 21(5): 686-693. doi:10.1016/j.sbi.2011.06.010.
John Wang and Edwin Olson, "AprilTag 2: Efficient and robust fiducial detection," 2016 IEEE/RSJ International Conference on Intelligent Robots and Systems (IROS) pp. 4193-4198, Oct. 1, 2016.
M. Fiala, NRC-CNRC ARTag Revision 1. A Fiducial Marker System Using Digital Techniques, Nov. 2024, 48 pgs.
P.J. Cumpson and M.P. Seah, Stability of Reference Masses IV: Growth of carbaceous contamination on platinum-iridium alloy surfaces, and cleaning by UV/ozone treatment, Metrologia, 1996, 33507-532.
Toshio Ando et al., "The 2018 correlative microscopy techniques roadmap" 2018 J. Phys. D: Appl. Phys., 43 pgs.
Website: https://imagemagick.org/script/download.php accessed 2025, 9 pgs.
Website: https://www.agilent.com/en/service/software-for-lab-management/ accessed 2025 "Lab Operations Management Sample Processing Management", 3 pgs.
Website: https://www.autoitscript.com/site/autoit/ accessed 2025, 6 pgs.
Website: https://www.pix4d.com/product/pix4dmapper-photogrammetry-software/PIX4Dmapper_Professional photogrammetry software for drone mapping_Pix4D, 2024.
Website: https://www.thermofisher.com/us/en/home/digital-solutions/lab-informatics/lab-information-management-systems-lims/solutions/samplemanager.html accessed 2025, 9 pgs.
Website: https://www.weforum.org/stories/2015/10/can-the-digital-twin-transform-manufacturing/, accessed 2025, 8 pgs.
Website: www.GitHub.com "An easy to use on-screen annotation software inspired by Epic Pen" accessed 2025, 7 pgs.
Website:https://www.ibm.com/think/topics/what-is-a-digital-twin, accessed 2025, 12 pgs.
Whitepaper "Multi-modal analysis of 2D materials with the XPS-SEM CISA Workflow," ThermoFisher Scientific, downloaded 2025, 3 pgs.
Yingying Su, et al., "Multi-dimensional correlative imaging of subcellular events:combining the strengths of light and electron microscopy" Biophys Rev (2010) 2: pp. 121-153.
Kraus, Karl, "Photogrammetry Geometry from Images and Laser Scans", Kraus, Karl, "Photogrammetry Geometry from Images and Laser Scans", Second Edition, 2004, 19 pgs.

* cited by examiner

1100

1110

SYSTEM AND METHOD FOR ANALYSIS OF SPECIMENS

CROSS-REFERENCE TO RELATED APPLICATION(S)

This application is a U.S. National Stage Application of PCT International Application No. PCT/AU2023/050358, filed on Apr. 30, 2023, entitled "SYSTEM AND METHOD FOR ANALYSIS OF SPECIMENS," which claims priority to Australian Patent Application No. 2022901177, filed on May 4, 2022, and Australian Patent Application No. 2023900936, filed on Apr. 2, 2023, which are incorporated herein by reference in their entireties.

TECHNICAL FIELD

The present disclosure generally relates to analysis of specimens and specifically to a chemical and a physical analysis of specimens, including imaging and spectroscopy.

BACKGROUND

In analytical laboratories, there is a frequent need to describe a small sample, specimen or artefact for communication of a position on that specimen (e.g. e-mail discussion of chemical analytical results for example). Examples of the specimens include, but are not limited to, a small lump of catalyst material on which electron microscopy or micro-analysis is to be performed, a piece of meteorite material being studied by microscopy and x-ray analysis, and a tooth from an extinct species of human found in a cave. The words "specimen" and "sample" will be used interchangeably throughout this document. Similarly, the word "analytical instrument" and "microscope" will be used interchangeably throughout this document.

There are different kinds of analytical instruments such as microscopes that are used in scientific context. Some microscopes use light to form an image, some use electrons, while others may use X-rays to form the image, and so on. While some microscopes outputs only images (i.e. micrographs), whereas others (such as imaging x-ray photoelectron spectroscopy, for example) output a chemical image or chemical micrograph of the specimen or spectrum characteristic of surface chemistry. Often these analytical instruments are quite expensive but have developed over many years to provide micrographs rapidly. Some of these microscopes operate in air, while others require vacuum or ultra-high-vacuum (UHV). Some can accommodate very large samples, others can accommodate only very small ones. Usually, modem analytical instruments have a desktop computer running them, frequently one running either Microsoft® Windows® or (less often) Linux® as an operating system. Examples of such microscopes are shown in FIGS. 5 to 7 and 11 to 15. Each microscope operates by a different physical method and therefore, present images that have very different contrast mechanisms. As can be seen from the drawings of analytical instruments in FIGS. 5, 6, 7, 11, 12, 13, 14 and 15, these days spatially-resolved analysis (i.e. analysis of specific points or areas) is generally done on the microscope or other instrument connected, and operated, via computer. FIGS. 16 and 17 show the screens of computers operating a scanning electron microscope (SEM) and an X-ray photoelectron spectroscopy (XPS) analytical instruments respectively. In both figures, an image of the specimen surface (the large granular panel in FIG. 16, and the top middle panel in FIG. 17) is shown. In both cases, the operator chooses a point within this specimen view, clicks a mouse, and uses that position to acquire a spectrum (an energy-dispersive X-ray (EDS) and XPS respectively) from it.

The analytical techniques that can usefully be applied in conjunction with this invention therefore include, but are not necessarily limited to, AES—Auger electron spectroscopy, AFM—Atomic force microscopy, ARPES—Angle resolved photoemission spectroscopy, ARUPS—Angle resolved ultraviolet photoemission spectroscopy, CARS—Coherent anti-Stokes Raman spectroscopy, CET—Cryo-electron tomography, Cryo-EM—Cryo-electron microscopy, Cryo-SEM—Cryo-scanning electron microscopy, EBIC—Electron beam induced current, EBSD—Electron backscatter diffraction, EDAX—Energy-dispersive analysis of x-rays, EDS or EDX—Energy dispersive X-ray spectroscopy, EELS—Electron energy loss spectroscopy, ESCA—Electron spectroscopy for chemical analysis see XPS, ESEM—Environmental scanning electron microscopy, ESTM—Electrochemical scanning tunnelling microscopy, EXAFS—Extended X-ray absorption fine structure, FCS—Fluorescence correlation spectroscopy, FCCS—Fluorescence cross-correlation spectroscopy, FEM—Field emission microscopy, FIB—Focused ion beam microscopy, FLIM—Fluorescence lifetime imaging, Fluorescence microscopy, FRET—Fluorescence resonance energy transfer, GIXR—Grazing incidence X-ray reflectivity, HAS—Helium atom scattering, HREELS—High resolution electron energy loss spectroscopy, HREM—High-resolution electron microscopy, HRTEM—High-resolution transmission electron microscopy, HE-PIXE—High-energy proton induced X-ray emission, IAES—Ion induced Auger electron spectroscopy, ISS—Ion scattering spectroscopy, LEED—Low-energy electron diffraction, LEEM—Low-energy electron microscopy, LEIS—Low-energy ion scattering, MALDI—Matrix-assisted laser desorption/ionization, MEIS—Medium energy ion scattering, MFM—Magnetic force microscopy, MRFM—Magnetic resonance force microscopy, Micro-CT—Micro computed tomography, MRI—Magnetic resonance imaging, NEXAFS—Near edge X-ray absorption fine structure, NSOM—Near-field optical microscopy, PhD—Photoelectron diffraction, PED—Photoelectron diffraction, PEELS—parallel electron energy loss spectroscopy, PEEM—Photoemission electron microscopy (or photoelectron emission microscopy), PES—Photoelectron spectroscopy, PIXE—Particle (or proton) induced X-ray spectroscopy, RBS—Rutherford backscattering spectrometry, RHEED—Reflection high energy electron diffraction, SAXS—Small angle X-ray scattering, SCANIIR—Surface composition by analysis of neutral species and ion-impact radiation, SCEM—Scanning confocal electron microscopy, SE—Spectroscopic ellipsometry, SEM—Scanning electron microscopy, SERS—Surface enhanced Raman spectroscopy, SERRS—Surface enhanced resonance Raman spectroscopy, SIMS—Secondary ion mass spectrometry, SNMS—Sputtered neutral species mass spectrometry, SNOM—Scanning near-field optical microscopy, SPM—Scanning probe microscopy, STEM—Scanning transmission electron microscopy, STM—Scanning tunnelling microscopy, STS—Scanning tunnelling spectroscopy, SXRD—Surface X-ray diffraction, TEM—Transmission electron microscopy, TOF-MS—Time-of-flight mass spectrometry, Two-photon excitation microscopy, TXRF—Total reflection X-ray fluorescence analysis, UPS—UV-photoelectron spectroscopy, XAES—X-ray induced Auger electron spectroscopy, XANES—XANES, synonymous with NEXAFS (near edge X-ray absorption fine structure), XAS—X-ray absorption spectroscopy, XPEEM—X-ray photoelectron emission microscopy, XPS—X-ray photoelectron spectroscopy and XRF—X-ray fluorescence analysis.

Increasingly, whether at universities or in industries, large and expensive analytical or machining instruments are being applied to the specimen. These universities or industries are often called as "central facilities", usually with a permanent staff to run and operate the analytical instruments. As an example, there may be 20 different analytical instruments in a central facility, each costing somewhere between US$1 m and US$10 m. Each university or industry may not be able to afford to buy all these analytical tools—often there will be only two or three such "central facilities" in an entire country, each having hundreds of users, and each user having their catalyst specimen, or meteorite, or tooth, or other specimens sent to the facility for analysis or modification. Examples of instruments in these facilities include electron microscopes, x-ray photoelectron spectroscopy instruments, imaging mass spectrometry instruments, and a selection of others from the list above.

Some types of instruments in those facilities do not concern here as per the disclosure are those instruments that analyse homogeneous specimens or liquid samples, for example most NMR (Nuclear Magnetic Resonance) analysis of solutions, or analysis of blood samples or samples of contaminated river water, for example. These types of homogeneous sample are often best managed using "LIMS" or Laboratory Information Management systems, in which each sample is given a unique identifier.

What does concern us are those types of specimen where it is important to know where on the specimen analysis is to be done, not just the unique identifier of the specimen as a whole, and the instruments used to do these kinds of spatially-resolved analyses. An example is scanning electron microscopy. Many scanning electron microscopes will image secondary electrons (giving the familiar type of monochrome high-resolution image of surface topography) but also allow the x-rays generated at the specimen surface by the impinging electrons to be analyzed, giving "energy-dispersive x-ray analysis" or EDS. The chemical elements can be identified from their characteristic x-rays. The point of the specimen being imaged at any particular instant is the same as that emitting x-rays, so the chemical image and the secondary electron image can be overlaid, giving both topographical and analytical information. Another example is x-ray photoelectron spectroscopy, one example of the aim of such analysis is shown in FIG. 10, where we can see that two different analytical positions (P1 and P2) on the same specimen give rise to a different spectra and therefore different analytical results in terms of the percentage composition.

Frequently, more than one type of microscope is needed to solve most of the problems. For example, some features may be visible in a light microscope (such as that shown in FIG. 6), but the sample then needs to be taken to an electron microscope (such as that shown in FIG. 12) to make smaller features (much smaller than the wavelength of light) visible [1]. In another embodiment, samples might be images with one chemically-specific microscope (e.g. an imaging x-ray photoelectron spectroscopy, XPS, system as shown in FIG. 15) then with another one (e.g. a Raman microscope) to look at different aspects of the chemistry to which the first is not sensitive. In these cases, the researcher currently has two options. The first option is to buy or build a specially combined microscope able to perform both techniques on a sample whereas the second option is to transfer the sample between two or more microscopes while keeping track of which areas are of interest, so that images from more than one technique can then be compared with certainty.

The first option is usually expensive, with the combined microscope costing more than separate ones. In some scenarios, throughput and performance of the combined microscope is generally compromised, and the combined microscope is often more difficult to use, and may require individuals to be trained in both techniques. Nevertheless, the first option can be useful in some cases. FIG. 21 shows schematically a combined optical/SEM instrument from Delmic® Inc. (Delft, The Netherlands). Specifically, FIG. 21 shows schematically how an optical microscope and electron microscope may be combined into a single instrument so as to give the user the ability to image part of the specimen in both light microscopy and electron microscopy near simultaneously and with good image registration. Building instruments like this is often expensive, and when a fault develops in one part (e.g. the electron microscope) it often makes the other part unusable. The present invention offers an alternative to this. As another example of a combined, multi-technique instrument, the Iontof® company (Muenster, Germany) offers the M6 ToFSIMS® and SPM combined in situ, using a precise piezo-stage to move the specimen between the analytical positions for each. However, this is much more expensive than separate ToFSIMS® and SPM® instruments.

The second option is generally cheaper and makes use of existing investments in separate microscopes and training, but the problem of this type of correlative microscopy is making sure that the same region is being analyzed in both microscopes, and identifying particular points needing analysis when these points are clear in a first analytical instrument but not in a second analysis instrument. It is this second option, and the problem of registering one image with respect to another, that is being concentrated on here, and which the present disclosure assists greatly.

A particularly common case of the second option is one in which two techniques are being applied to the specimen, one of which gives an excellent image (this might be by light microscopy, or electron microscopy for example) and then a researcher wants to perform a chemical analysis of specific features within that field of view[2]. For example, an atomic force microscopy (AFM) image might show particles on the surface of the specimen, and the researcher may wish then to analyze the chemical composition of one particle having a different shape to the others. One might then need to take the sample to an instrument with chemical analysis capability to see what that particle is made of. In these cases, one or more "point analyses" at points of interest (POIs) are typically done, perhaps in a Raman spectrometer, or using energy-dispersive X-ray analysis in a scanning electron microscope (SEM). Here, the problem is of identifying points (or regions) of interest within the field accessible to instrument B after having identified those points (or regions) of interest by imaging in instrument A, when the coordinate systems of the two instruments (i.e. their x, y and z for their samples) are completely different.

As examples of specific applications, consider the following. Suppose a researcher sees a lesion on the tooth of a human ancestor and then sends that tooth for analysis to find the chemical composition of the tiny amount of material within the lesion. Or a failed catalyst may show spots of an unknown brown material—it then becomes important to find out the chemical nature of the brown material to help correct the problem that led to catalyst failure. So, we have a situation in which many users need spatially resolved analysis of specimens. Also, the analytical instrument to do it is generally very expensive and therefore at a central facility, and often not at the same location as the researcher. Moreover, it would be slow and expensive to analyze every point on the specimen surface, so only the points or regions interesting to the researcher (POIs or ROIs respectively) should be analyzed. Therefore, the researcher must take (or send) the specimen to the staff of the central facility and describe where on the specimen they want the analysis to be done.

This description is often difficult at the resolution needed. The researcher, having dug-up their human tooth may look at it under an optical microscope and identify an interesting point for analysis (for example an ancient lesion). The researcher will then send the tooth to the central facility along with a photograph taken under the microscope, with the position to be analyzed marked on it, like the X on a pirate's treasure map.

Another difficulty that arises is that the specimen looks different in an electron microscope compared to a light microscope. Certainly, orientation and scale may be different. More importantly the origins of image contrast are completely different. Sometimes finding the position to analyze is easy, sometimes extremely hard, even with photos. Even if the enamel of the tooth looks uniformly white in light microscopy, there may be chemical variations that show up in the SEM image and cause disorientation. Conversely, there may be differences in color on the surface of the meteorite even though the chemistry is pretty uniform, so marks visible by eye do not show up in the SEM at all or are obscured by topographical contrast. Even the researcher themselves may find it difficult to navigate around the specimen to the position(s) they want to analyze. Therefore, time is wasted on expensive instruments. Despite the high technology being applied, the researcher is often reduced to primitive and inaccurate means of locating the point to be analyzed. For example, scratching a cross on the specimen with a pin or identifying the point in relation to nearby random features that look similar in light and electron microscopy (even though they may look similar quite by chance potentially leading to an error). For example, "2 mm up from the thing that looks like a fish, and 1 mm left from the thing than looks a bit like a map of Australia".

One can place over the specimen a fine, annotated grid, perhaps made of copper, which has tiny letters labelling each square hole in the grid. The grid itself is easily visible in optical and electron microscopes. But it can get in the way, it can modify the surface it comes into contact with, and it is tricky to immobilize without glue (and glues modify the surface chemistry too). Therefore, there is required a dynamic system that can solve the above-mentioned problems. There are a few approaches that help, or may help in the future, but which have severe problems of their own. One solution in some cases in the future (though I have never seen this in practice yet) is the use of a "digital twin" for a manufactured component. A digital twin is a virtual representation that serves as the real-time digital counterpart of a physical object or process. In design and manufacturing a digital twin is a digital representation, similar to (or containing) a computer-aided-design (CAD) file of the component. Take a stainless-steel bolt as an example. If one saw a brown corrosion spot on a bolt made in a factory one could communicate the position on the bolt in reference to the xyz coordinate system of the digital twin. One would add the coordinates of the brown spot for analysis to the digital twin file before sending it to the central facility with the bolt itself. Even without having to match up with an optical photo the staff in the central facility could (at least in principle) use the digital twin information to direct the analytical instrument straight to the point with the brown stain. In reality there is just no software infrastructure to achieve this yet, even for small manufactured components. Anyway, most specimens presented for analysis are either natural products (such as a meteorite for example) for which no digital twin ever existed, or something cut or broken off a larger item (for example a few square centimetres of cladding from a large building that needs chemical analysis to assess its fire-worthiness) where the digital twin either does not exist or cannot be digitally sampled in the same way as the real specimen was created. As yet, none of these problems anywhere has been solved using a CAD-generated digital twin to my knowledge, though it may happen in a small number of cases in the future. A slight exception is in the special case of a semiconductor chip, where "fiducial markers" such as crosses are built-in to the design along with the transistors on the chip and designed to be visible optically as well as by other microscopies. One can define points on this planar chip surface, in reference to the chip CAD layout, for analysis (perhaps by electron microscopy and x-ray methods). One can find those points given coordinates with respect to the fiducial markers[3] seen under the microscope. But all this is in 2D. This is fine for semiconductor chips, but most samples are 3D with a lot of topography and a 3D shape.

Existing Approaches

Often one can use chance features that are visible in both microscopes (e.g. a particular random pattern of dust on the surface) to identify the region common to both microscopes, then scale, translate and re-orientate one of the micrographs so as to match the area seen in the other, and then potentially overlay the images. Sometimes one can add fiducial markers to provide points that can later be used as registration markers (e.g. a small cross made carefully with a sharp scalpel blade). Sometimes, rather annoyingly, even with such fiducial markers being present in both images they can look very different. This is due to the different contrast mechanisms that take place in different modes of imaging. As a result, some of the worst cases become quite subjective and co-registration can be time-consuming to get right, repeat or reproduce in another laboratory. Even when the registration issue is clear, there is often no way to record spectra or other information associated with particular positions on the specimen except to mark positions (say #1, #2 and so on) on a photograph and record the filename of those spectra against the numbers in a laboratory notebook. This is then very difficult to discuss with a remote customer or collaborator, for example via teleconferencing.

Many approaches to the registration problem have been developed. They are either difficult, time-consuming or have been developed as proprietary methods by one instrument manufacturer and "lock you in" to using their hardware. An instrument manufacturer may make more than one type of instrument, for example SEMs and AFMs. They may provide their customers with easy ways to transfer samples from their SEMs to their AFMs, perhaps with the use of common designs of sample holder having specially designed fiducial markers and/or special proprietary software running on the supervising PC. Inevitably, though, many users have a variety of instruments from a variety of instrument manufacturers, and the proprietary solution from a company (say Company P) is typically completely different to, and incompatible with, the method sold by another company (say Company Q). Moreover, neither Company P nor Company Q may make Raman spectrometers (for example) so that the researcher needs to do a point analysis on the surface of the specimen, neither proprietary solution to the registration problem helps the researcher.

We (myself along with my former PhD student in the UK) recently published a research paper describing, a method for using computer-readable fiducial markers for image registration[13], particularly including information about how these markers can be fabricated, for example by Focused Ion Beam (FIB) milling. This allows a software running on a computer to identify a QR-code-like fiducial marker in images from different microscopes, then overlay them. The computer-readable fiducial markers used are known as "Apriltags®" [4], and have been developed for use in robotic computer vision (though QR codes and others would work too). According to use, we are the first ones to apply Apriltags® to the image registration problem in microscopy. In looking for a way to make this approach more useful and widely-applicable, I have since been inspired by the type of "screen annotation software" available for personal computers.

SOME PRIOR ARTS

There are many publications on the correlative microscopy[12, 13, 21, 22] problem of registration. A "CISA" workflow from Thermo Scientific[23] achieves correlative registration between SEM and XPS based on the mechanical registration of a large sample proprietary holder in the two instruments. It is the stage coordinates that are locked from one instrument to another, and only in two dimensions (2D). It does not use CRFMs (that will be described below) and therefore one is limited to analytical tools from one manufacturer and their proprietary software system. A single manufacturer is unlikely to produce the best analytical instruments for all the techniques a user wants, and therefore going outside the tools of this manufacturer one is reduced to marking an X on a picture to find the POI in the next instrument. Because no out-of-plane CRFMs (such as those shown in FIG. 1) are used a correlative imaging and surface analysis (CISA) workflow[23] is limited to 2D sample navigation. The CISA workflow has no equivalent of the DAT scanner, so one needs to load a specimen into the expensive XPS instrument before beginning work.

The idea of a computer-readable fiducial marker and its advantages was published recently[13]. Many other types of fiducial marker have been tried over the years[21], but typically requiring manual identification and registration. They often overcome the problem of different contrast mechanisms in different types of microscopy by special choice of material for the fiducial markers (e.g. fluorescent nanoparticles that can easily be identified by both light and electron microscopy[24]) but still need manual registration even if clearly visible in all microscopes.

Screen Annotation Software

Several software packages (some free, some commercial) allow one to write over whatever is on a PC screen—effectively giving the opportunity to annotate it. This is possible even when the application window(s) displayed are "live", i.e. running on that PC. The effect is as if you were writing on a piece of cellophane in front of the screen of the computer running the software—any software. Such screen annotation software packages are very useful for teachers and lecturers, because they can write over what is on the screen. Imagine giving a lecture on a piece of Computer Aided Design (CAD) software for example; one can circle particular buttons, draw arrows pointing to particular parts of the design etc., all without affecting the CAD software at all.

SUMMARY

A scanning system, a method, and a computer program product are provided herein that focuses on analysis of specimen.

In one aspect, a scanning system for analysis of specimen is disclosed. The scanning system includes processor and a memory communicatively coupled to the processor, wherein the memory stores a plurality of processor-executable instructions which upon execution by the processor cause the processor to control a plurality of image capture devices to capture a first plurality of images of a specimen and at least one fiducial marker, wherein the specimen is placed on a specimen holder and the at least one fiducial maker is associated with at least one of the specimen or the specimen holder. The scanning system is further configured to generate a three-dimensional model (3D model) of the specimen based on an application of one or more photogrammetry techniques on the captured first plurality of images, wherein the one or more photogrammetry techniques captures information associated with a first coordinate system associated with the generated 3D model. The scanning system is further configured to generate a data structure associated with the specimen based on the generated 3D model. The scanning system is further configured to output the generated data structure comprising the first co-ordinate system associated with the generated 3D model, a second co-ordinate system associated with the specimen, and a corresponding relationship between the first co-ordinate system and the second co-ordinate system.

In additional embodiment, the scanning system is configured to control a movement of the specimen holder to rotate from a first position to a second position. The scanning system is further configured to control the plurality of image capture devices to capture a second plurality of images of the specimen and the at least one fiducial marker, wherein the specimen holder is in the second position. The scanning system is further configured to generate the 3D model of the specimen further based on the application of the one or more photogrammetry techniques on the captured first plurality of images and the captured second plurality of images.

In additional embodiment, the generated data structure corresponds to an extensible mark-up language (XML) file.

In additional embodiment, the at least one fiducial marker corresponds to one of: a quick response (QR) code, a barcode, an AprilTag®, an ARtag, or an ArUco marker.

In additional embodiment, the scanning system is configured to generate the second co-ordinate system associated with the specimen based on the at least one fiducial marker.

In additional embodiment, the generated data structure includes information associated with a first region of interest (RoI) of the specimen to be analyzed using a first analytical instrument integrated within the scanning system or using a second analytical instrument having a different co-ordinate system from the first analytical instrument.

In additional embodiment, the scanning system is configured to receive a first user input associated with a marking of at least one point of interest on the generated 3D model. The scanning system is further configured to store information associated with the marking of the at least one point of interest in the generated data structure based on the reception of the first user input and output the generated data structure.

In additional embodiment, at least one point of interest is marked for an analysis under one or more analytical instruments.

In additional embodiment, the specimen corresponds to a heterogeneous specimen.

In one aspect, a method for analyzing the specimen is provided. The method includes rendering a first image of a region of interest (RoI) of a specimen on a first analytical instrument, wherein the rendered first image includes at least one fiducial maker and is captured by the first analytical instrument. The method further includes receiving, from the first analytical instrument, a second user input associated with a selection of a point of interest within the rendered first image. The method further includes determining position information associated with the selected point of interest based on the reception of the second user input, wherein the determined position information comprises a position of the selected point of interest relative to the at least one fiducial marker. The method further includes storing the determined position information in a data structure. The method further includes receiving a third user input associated with rendering of a second image of the region of interest on a second analytical instrument, wherein the second analytical instrument is different from the first analytical instrument. The method further includes controlling the second analytical instrument to scan the stored data structure for determining a position of the at least one fiducial marker in the second image based on the received third user input. The method further includes applying at least one transformation technique on the position information stored in data structure based on the scanning. The method further includes rendering the first image of the selected point of interest on the second analytical instrument based on the application of the at least one transformation technique.

In additional method embodiments, the first image of the selected point of interest is captured by the second analytical instrument.

In additional method embodiments, the applied at least one transformation technique comprises a projective geometry transformation technique.

In additional method embodiments, the method includes scanning the rendered first image to determine a first position of at least one fiducial marker within the rendered first image and determining position information associated with the selected point of interest based on the scanning of the first image.

In additional method embodiments, the method includes receiving a fourth user input associated with the selected point of interest, wherein the received fourth user input includes a first label and first information associated with the selected point of interest and storing the first label and the first information associated with the selected point of interest in the data structure based on the received fourth user input.

In additional method embodiments, the data structure corresponds to a digital analytical twin (DAT) data structure associated with the specimen and is a digital replica of the specimen.

In additional method embodiments, the specimen corresponds to a heterogeneous specimen.

In additional method embodiments, the fiducial maker corresponds to one of a quick response (QR) code, a barcode, an AprilTag®, an ARtag, or an ArUco marker.

In one aspect, a method for analyzing the specimen is provided. The method includes controlling a plurality of image capture devices to capture a first plurality of images of a specimen and at least one fiducial marker, wherein the specimen is placed on a specimen holder and the at least one fiducial maker is associated with at least one of the specimen or the specimen holder. The method further includes generating a three-dimensional model (3D model) of the specimen based on an application of one or more photogrammetry techniques on the captured first plurality of images, wherein the one or more photogrammetry techniques captures information associated with a first coordinate system associated with the generated 3D model. The method further includes generating a data structure associated with the specimen based on the generated 3D model. The method further includes generating a data structure associated with the specimen based on the generated 3D model.

In additional method embodiments, the method includes controlling a movement of the specimen holder to rotate from a first position to a second position, wherein the specimen is placed on the specimen holder. The method further includes controlling the plurality of image capture devices to capture a second plurality of images of the specimen and at least one fiducial marker, wherein the specimen holder is in the second position. The method further includes generating the 3D model of the specimen further based on the application of one or more photogrammetry techniques on the captured first plurality of images and the captured second plurality of images.

In additional method embodiments, the fiducial maker corresponds to one of a quick response (QR) code, a barcode, an AprilTag®, an ARtag, or an ArUco marker.

The invention comprises of a portable analytical registration software (PARS) software system, a third-party system running alongside (but not part of) the software running the analytical instrument, and preferably recording information into a Digital Analytical Twin (DAT) data structure for the specimen in question, The Digital Analytical Twin (DAT) data structure, obtained from a DAT Scanner, a hardware device used to create the DAT data structure from a physical specimen.

PARS Software System

As discussed above, the PARS system may be a third-party system that may be running alongside (but not part of) the software running the analytical instrument. An important feature of the PARS system may be how the PARS software interacts with the existing software used for acquiring spectra or images from the analytical instrument. This is explained with help of an example.

Let us take a case that we have two analytical instruments, a first analytical instrument “J” and a second analytical instrument “K”. The first analytical instrument “J” may be, manufactured by a first company “JJ” may be operated by a first software package “JJJ”. Similarly, the second analytical instrument “K” may be manufactured by a second company “KK” may be operated by a second software package “KKK”. The first analytical instrument “J” and the second analytical instrument “K” may be, for example, taken from the types of instruments shown in FIGS. 5 to 7 or 11 to 15, or from the list of techniques above. In an embodiment, the first company “JJ” and the second company “KK” may be the same, but it may still be that the first software package “JJJ” and the second software package “KKK” may be incompatible for different microscopes and offer nothing in terms of interchangeability of image registration. The present disclosure comprises of a third software package “N” capable of running on both acquisition computers operating the first analytical instrument “J” and the second analytical instrument “K”, or at least a single computer able to read and display files from the first analytical instrument “J” and the second analytical instrument “K”. The third software package "N" may be set running first on the computer that operates instrument first analytical instrument "J", then subsequently on the computer that operates instrument the second analytical instrument "K".

1. The third software package "N" runs in the background (i.e. with few visible features on screen) on the same computer running the first software package "JJJ". It runs on the same computer in parallel with the first software package "JJJ", but does not interact with it directly. The first software package "JJJ" controls the operation of instrument the first analytical instrument "J", and displays images from the first analytical instrument "J".
2. The first software package "JJJ" displays a view of the sample surface, gained through the first analytical instrument "J". This image incorporates part of the sample marked with a computer-readable fiducial marker (e.g. an Apriltag®) in view, as rendered by the first analytical instrument "J".
3. A user alerts the third software package "N" that he or she wishes to mark a point on the sample (perhaps by pressing a "hotkey", or pressing a button on the third software package "N" 's's small graphical user interface (GUI)) if one is displayed.
4. The user then clicks the mouse or pointer at the place to be marked within the image displayed on the screen by the first software package "JJJ". The third software package "N" records this position on the screen, and scans the screen image to find any computer-readable fiducial marker or markers (this could, in another embodiment, be done repeatedly so that scanning is already over by the time the user clicks the mouse on this position). The position of the selected point with respect to the computer-readable fiducial marker, is then stored (e.g. in a file, which may be a DAT data structure, on a USB stick for example).
5. Optionally, the third software package "N" then prompts the user for a label or other information to be associated with the stored point. This is then stored in a file as well as the point coordinate. The stored data, both the point location with respect to fiducial markers and other information about that point, is stored as data "D". The data "D" may be a DAT data structure.
6. Later, when the same sample is being viewed under the second analytical instrument "K", perhaps operated by a different computer in a different location running the second software package "KKK", the user invokes the third software package "N" to mark the locations of previously stored points (perhaps using a hotkey).
7. The third software package "N" scans the screen searching for computer-readable fiducial marker(s). It then finds the corresponding marker(s) in its stored data files (perhaps on the USB drive) and which points have been previously defined with respect to the said visible marker(s).
8. The third software package "N" then indicates the point requested at its correct location on the image from the second analytical instrument "K". This may be optionally by moving the mouse pointer to the pixel corresponding to that point in the image. It may also be indicated by optionally displaying marker(s) for those points (perhaps an arrow or circle) overlaying the display coming from the second software package "KKK", together with any labels associated with those points (taken from stored data "D") in the manor of "screen annotation software" as described above.
9. The user can then choose to analyze one or more of those points on the sample using the second analytical instrument "K" through the second software package "KKK". Often this will mean clicking the mouse on one of the points marked by the third software package "N" while the second software package "KKK" may be sensitive to the mouse position that the user is choosing. Indeed, the mouse may be moved to that position too, so that if the second software package "KKK" is ready to acquire a point analysis, the mouse is already set to the correct point to do it.

Some embodiments of the present disclosure can make it easy to transfer the third software package "N" and data "D" from the first analytical instrument "J" to the second analytical instrument "K". For example, this could be done by third software package "N" being available on a networked storage available to them both, where data "D" can also be stored. In another embodiment the third software package "N" may be stored on a portable drive (perhaps a USB drive) that the user can take from the first analytical instrument "J" to the second analytical instrument "K". When plugged in to from the first analytical instrument "J" the data "D" can be stored on this drive, later to be read by third software package "N" when running on computer associated with the second analytical instrument "K". One embodiment is for the data "D" to be a Digital Analytical Twin (DAT) as described below.

Note that in step 8 above there will be a transformation of coordinate system required to find the position of the pixel on screen corresponding to the defined point. This will generally be an affine transformation, unless other non-projective transformations (for example spherical aberration) are present in the optics of the first analytical instrument "J" or the second analytical instrument "K". It may be expected that this may be unusual in well-made commercial instruments. In Euclidean geometry, the affine transformation may be a geometric transformation that preserves lines and parallelism (but not necessarily distances and angles). The equations providing for this affine transformation may be conveniently expressed in an Augmented Matrix form. Distances (at least in terms of on-screen pixels) are not preserved between the first analytical instrument "J" and the second analytical instrument "K" because, for example, these may be analytical instruments having different magnifications. Angles may not be preserved because the angle with respect to the surface normal at which the surface is viewed may be different in the J and K, so that what one observes (for example) as a right angle in one of them may be more (or less) than 90 degrees in the other.

An advantage of this disclosure is that correlative microscopy may be performed even though the user has no access to the first software package "JJJ" and the second software package "KKK" and cannot modify or re-write any of it to get them to communicate coordinate information sufficient to find sample points of interest on both instruments. Such modifications would be difficult, expensive, and depend on cooperation from the instrument manufacturers that is often not available.

Digital Analytical Twins and the "DAT" Scanner

Now let us move on from the PARS system (or the third software package "N") to discuss the Digital Analytical Twin (DAT) structure under which the data coming from the use of PARS system can be very effectively used.

A method and a scanning system (a DAT scanner) are disclosed. The function of the scanning system is to generate a "digital twin" from the specimen using one or more photogrammetry[5] techniques. In general, the photogrammetry may be a mathematical technique that may generate three-dimensional coordinates of points identified from multiple images of the same object obtained at different angles. The digital twin in the context of analysis (rather than manufacturing where the term is currently used) may be a virtual representation that serves as the real-time digital counterpart of a physical object or process, that assists in the systematic analysis of that physical object by containing spatial and/or analytical (composition) information. In an analytical context (for reasons described in the previous section) the digital twin must typically be generated by measurement rather than Computer Aided Design (CAD), and the one or more photogrammetry techniques may be a rapid and capable way to start. One or more software's associated with the one or more photogrammetry techniques are now widely available and known in the art, for example Pix3D®[6].

Further, a new approach for the registration of all analytical techniques applied to the specimen by the use of computer readable fiducial markers fixed to the physical specimen but also recorded within the digital twin is disclosed. The Fiducial markers are fixed to the specimen or fixed to a specimen holder that may be fixed to the specimen (preferably fiducial markers that can be read automatically by computer from image(s)). Examples of the kind of specimen holders common in microscopy are shown in FIG. 18. The computer-readable fiducial markers are then firmly fixed to the specimen holder, or printed on the surface, or written (for example by inkjet printing or laser engraving). The specimen may be firmly fixed to the specimen holder (as is the existing practice). This means that the specimen may now have a fixed position and orientation with respect to the computer readable fiducial marker(s), CRFMs. These said fiducial markers then are used to define a coordinate system, preferably an xyz Cartesian coordinate system for the digital twin 3D model after photogrammetry provides a data file, for example a 3D representation in ".STL" format.

The method for a particular specimen is as follows ("sample" and "specimen" are used interchangeably here)

1. The specimen is firmly attached to the specimen sample holder having one or more fiducial markers, or fiducial markers are firmly attached to the specimen itself (for example by printing, gluing or focused ion-beam milling).
    a. Optionally these fiducial markers are identifiable and readable automatically by computer software (e.g. "AprilTags®"[7,8]).
    b. Enough fiducial markers will be used to define a coordinate system appropriate for the dimensionality of the specimen. Thus, for a 2D specimen (the surface of a silicon chip for example) three points in space or more will be defined by the fiducial marker(s). For 3D specimens, at least 4 points will be defined by those fiducial marker(s).
    c. As a concrete example, two Apriltags® on two sides of a cube can be used to define 8 points in space (the corners of the Apriltags®). This cube is firmly fixed to the specimen so that both Apriltags® are visible.
    d. Specimen holders may be manufactured in advance displaying fiducial markers. Then the specimen need only be firmly fixed to the specimen holder, as is usual in many kinds of specimen analysis.
2. A first plurality of images are captured from a plurality of image capture devices, typically near-simultaneously. These first plurality of images are conveniently captured by the plurality of image capture devices (or cameras) giving views from plural angles around the specimen. The plurality of image capture devices may be controlled to capture the first plurality of images of the specimen. Typically, the first plurality of images may at least 5 images of the specimen.
3. The one or more photogrammetry techniques may be applied to generate a 3D model of the specimen, for example as a ".STL" file. Crucially, as well as morphology the one or more photogrammetry techniques may capture the fiducial markers within the images and use them to define the xyz coordinate system on which the points of the 3D model of the specimen surface are defined. This makes the "Digital Analytical Twin" scanner or the scanning system more than a conventional 3D photogrammetry scanner of the type used in rapid prototyping. The fiducial markers may be further used to generate a 3D (or 2D in the case of a planar specimen) coordinate system by which points on the specimen can later be identified using other microscopes able to image the same fiducial markers but unable to generate any 3D model. This coordinate system, and its (fixed) relationship to the 3D model coordinate system, are recorded in the digital twin file(s).
4. Optionally the user can add, and possibly also label with text, points or areas on the digital analytical twin 3D model for later analysis.
5. The digital analytical twin may be transported to the analytical facility along with the specimen itself (for example, via a USB drive accompanying the specimen, or via an electronic mail, via a file transfer server or via any other means for the transfer of digital files). In an embodiment, the digital analytical twin file(s) may be stored within a laboratory information management system (LIMS) that organizes and/or schedules the work of an analytical laboratory (for example, Adjalent's iLab®[9], or Thermo Scientific's SampleManager® LIMS[10]).
6. Optionally the digital analytical twin can be used to discuss an analytical strategy (i.e. which points on the specimen to analyze next and in what order). This may be conveniently done by viewing the 3D model rendered on screen by computer, or (if the parties are in different places) using internet conferencing and screen share software such as "Microsoft® Teams®" or "Zoom®".

A key issue to note occurs in step 3 above. Here, the one or more photogrammetry techniques are used to determine the coordinates of many points on the surface of the specimen, so as to produce the "3D model". Yet also incorporated in that 3D model is the coordinate system described by the computer-readable fiducial markers. This means that later, when the specimen is brought to an analytical instrument that has no capability for photogrammetry, the previously recorded points on the surface that form the 3D model, together with the coordinate axes defined with respect to the computer-readable fiducial markers, can be used to identify points on that surface using only computer-readable fiducial markers that can be seen in images of the specimen taken using the said analytical instrument.

When the analysis expert member of staff at the central facility comes to view the specimen using the computer attached to his analytical tool (e.g. an electron microscope) the points of interest defined in step 4 are automatically overlaid on the image using software within that computer, for example the PARS system described above, optionally annotated with the originating user comments, or other information such as elements present. This can be done automatically if the fiducial markers are computer readable i.e. the software identifies one or more such fiducial markers in the analytical instrument image being displayed and then through 3D trigonometry finds the position of points of interest (the coordinates of which are recorded in the digital twin file(s)) as they appear in the present image. Examples of computer readable fiducial markers include AprilTags®, ARTags[11], Arco markers and others. Crucially, this does not depend on having access to be able to modify the software of the instrument manufacturers at all. Instead, an on-screen annotation software may be used to overlay a marker "on top" of the image shown by the instrument manufacturer's software, i.e. shown on the screen but not by the analytical instrument manufacturer's software. The common xyz coordinate system provided by the "digital analytical twin" file(s) allows easier correlative microscopy, i.e. the ability to correlate different microscopy techniques from often radically different types of microscope or analytical instrument, being able to overlay the results of one technique on the other(s).

Steps 2 and optionally 3 are performed by the scanning system that is also referred as a "Digital Analytical Twin Scanner" or DATS. This constitutes an apparatus/system of this invention.

FIG. 1 shows the key components of the DAT scanner (DATS) instrument schematically. A specimen (130), which may be fixed to a specimen holder (150), has computer-readable fiducial markers (110 and 120) firmly fixed to the specimen (130) and/or the specimen holder (150). In the FIG. 1, the fiducial markers shown are Apriltags®. A first plurality of images of the specimen and fiducial markers are acquired by a plurality of image capture devices (cameras) (100) and the first plurality of images are further transmitted to the computer (140) for numerical processing by photogrammetry. During experimentation, Ipevo® V4K cameras (Ipevo® Inc., Sunnyvale, CA, USA, as shown in FIG. 19) and generic USB microscope cameras (e.g. a Colemeter® 2 megapixel type, from the Colemeter® Instrument Co. Ltd, Hong Kong, as shown in FIG. 20) were used for smaller specimens, though most digital cameras would work well in this application. Although the diagram is in two dimensions, it is intended to show that the plurality of image capture devices (110) are pointed towards the specimen (130) from a wide range of solid angle in 3D, so that ambiguities in the photogrammetry are minimized. In an embodiment, the scanning system may be configured to control a movement of the specimen holder (150) to rotate from a first position to a second position. The scanning system may further control the plurality of image capture devices to capture a second plurality of images of the specimen and the at least one fiducial marker, wherein the specimen holder is in the second position. The scanning system may further generate the 3D model of the specimen further based on the application of the one or more photogrammetry techniques on the captured first plurality of images and the captured second plurality of images. It may be noted that the sample holder (150) may be rotated according to at least axis so that multiple images from each camera can be recorded, increasing the quality and accuracy of photogrammetry.

To ensure good lighting conditions, and minimize shadows, the specimen may be enclosed in a diffusely-reflecting "integrating sphere" or a structure approximating to one, with integrated a set of light emitting diodes (LEDs). In some embodiments, the integrated LED set of LEDs may also be a component of the scanning system or the DATS scanner. During experimentation the apparatuses shown in FIG. 24 and FIG. 25 were separately used to achieve this.

Some examples of using computer readable fiducial markers have been published[13]. Briefly, in any analytical instrument connected to a computer showing the image through the microscope on a computer monitor, provided that analytical instrument is capable of imaging the fiducial markers, and at least a minimum number of such fiducial markers are in view, a point defined earlier by a user can be highlighted on the screen. This is possible even without having access to the software provided by the instrument manufacturer, simply by having access to the image currently being displayed on the monitor by the operating system.

In some cases, a point of interest or a region of interest defined by the user may be out of the field of view of the microscope when the fiducial marker(s) are in view. This case is illustrated schematically in FIG. 2. In FIG. 2 the fiducial marker (200) is an Apriltag®, within the initial field of view (210) of the microscope. The four corners of the fiducial marker are at known positions within the digital twin information accessible to the computer operating the microscope. Using that positional information software can determine that the point of interest, (220), is not visible in this initial field of view, though the direction in which it lies can be indicated (for example by an on-screen arrow annotation). In this case it is possible for software to automatically follow the panning of the microscopy image on screen as it moves under operator control from the initial field of view (FOV) (230) to the next FOV (240), to the next FOV (250) and finally to the last FOV (260) so that when the point of interest (210) comes within the field of view it is indicated (for example with a screen annotation at that position). Correlation of successive images (230, then 240, then 250 then 260) by computer as such panning takes place allows this point to be located accurately even if the fiducial marker(s) are no longer in view.

This is provided there is enough contrast and adventitious features (not shown in FIG. 2, but assumed to be present within 230, 240, 250 and 260) within these FOVs for each to be accurately located with respect to the previous FOV. It is nearly always the case for practical specimens that such contrast exists and such features are available.

It is possible to add analytical results information to the digital twin file(s) so that they are associated with the analytical position on the real specimen. Thus, over time, results from several different analytical methods may build-up in this digital analytical twin, and can be reviewed by both centre staff and analytical customer/user. Thus the special information of each analytical technique may be leveraged strongly to provide an overall understanding of the specimen.

Reduction to Practice: Mathematical Modelling and Solution

First consider the coordinate system of the analytical instrument that patterns the square tag on the sample surface. For simplicity let us take the size of the square tag to be unity in each direction. The true size of the square may be, for example, 10 μm or 50 nm. It is supposed that the side of the square tag as twice the unit of distance across the sample surface.

For a square fiducial marker, such as an AprilTag® or QR code, it is possible to form an image of the position of the centre of the tag, and its four corners (A, B, C and D) as shown in FIG. 3. More than one software package may be available for Apriltag® location, and for QR code location. These typically provide, at minimum, the location within the pixel array of the four corners of the square tag and its centre. In some cases, there may be more information available from a software that automatically identifies these fiducial markers, such as a transformation matrix that would assist in co-registration of images. These could be used. In some embodiments, these additional matrices may not be available without an extra calibration, or may tend to be the most unreliable aspects of the output of these software's because they are not frequently used and therefore not intensively tested. Therefore, the corners and the centre of the fiducial markers may be used for image co-registration.

The corners (here labelled A, B, C and D) may be distinguishable from each other based on the internal pattern of the Apriltag or QR code. So corner A can never be confused with corner C for example, because the pattern is insufficiently symmetrical to allow such confusion. The x,y plane of the image is made up of a large number of pixels in a grid, so that for example the corner A of the Apriltag or QR code in this image is reported as a pixel having position $x_1'$ and $y_1'$ (FIG. 2). Usually these coordinates will be integers, but in some cases the software identifying the tag can give more precise positions as floating-point numbers, for example where the corner can be found to be between pixels.

There are two classes of 2D linear transformations—projective and affine. In most microscopy-relevant transformations an affine description is sufficient, but here the projective model is chosen as it copes better with some oblique views of a surface. The projective transformation can be represented with the following matrix.

$$\begin{pmatrix} a1 & a2 & b1 \\ a3 & a4 & b2 \\ c1 & c2 & 1 \end{pmatrix} \qquad \text{Eqn (1)}$$

Where:

$$\begin{pmatrix} a1 & a2 \\ a3 & a4 \end{pmatrix} \qquad \text{Eqn (2)}$$

is a rotation matrix. This matrix defines the kind of the transformation that will be performed: scaling, rotation, and so on.

$$\begin{pmatrix} b1 \\ b2 \end{pmatrix} \qquad \text{Eqn (3)}$$

is the translation vector. It simply moves the centre of the square, and $$\begin{pmatrix} c1 & c2 \end{pmatrix} \qquad \text{Eqn (4)}$$

is the projection vector. In most applications in microscopy, the elements of this projective vector may be small, though in cases of perspective in macroscopic photography, for example, they can be significant.

If x and y are the coordinates of a point, the transformation can be done by the simple multiplication:

$$\begin{pmatrix} a1 & a2 & b1 \\ a3 & a4 & b2 \\ c1 & c2 & 1 \end{pmatrix} \times \begin{pmatrix} x \\ y \\ 1 \end{pmatrix} = \begin{pmatrix} x' \\ y' \\ 1 \end{pmatrix} \qquad \text{Eqn (5)}$$

Here, x' and y' are the coordinates of the transformed point.

Let A be the transformation matrix;

$$A = \begin{pmatrix} a1 & a2 & b1 \\ a3 & a4 & b2 \\ c1 & c2 & 1 \end{pmatrix} \qquad \text{Eqn (6)}$$

There are five points (the corners and centre of the square tag) that are at known positions in a focused ion beam (FIB) x,y plane; (x,y)=(−1,−1), (1,−1), (1,1), (−1,1) and (0, 0), this last point being the center of the tag.

$$A \times \begin{pmatrix} -1 & 1 & 1 & -1 & 0 \\ -1 & -1 & 1 & 1 & 0 \\ 1 & 1 & 1 & 1 & 1 \end{pmatrix} = \begin{pmatrix} x'1 & x'2 & x'3 & x'4 & x'c \\ y'1 & y'2 & y'3 & y'4 & y'c \\ 1 & 1 & 1 & 1 & 1 \end{pmatrix} \qquad \text{Eqn (7)}$$

The values for the five pairs of x' and y' are known from the tag identification in the image. First A has to be found for that image so that we can map the pixels of that image onto the original defined plane (x,y). There may be more than enough measurements; indeed this system of equations is overdetermined, and it can be solved in the least-squares sense using the Moore-Penrose pseudoinverse of the (3×5) matrix of (x,y) values in the original defined plane. Indeed, since this is always the same, it can be stated that the Moore-Penrose pseudoinverse once-and-for-all as;

$$P = \begin{pmatrix} -5 & -5 & 4 \\ 5 & -5 & 4 \\ 5 & 5 & 4 \\ -5 & 5 & 4 \\ 0 & 0 & 4 \end{pmatrix} / 20 \qquad \text{Eqn (8)}$$

So, to find the co-ordinates in the original plane of a pixel at (x', y') in any image acquired by a different technique, just multiply those coordinates by the pseudoinverse;

$$\begin{pmatrix} x \\ y \\ 1 \end{pmatrix} = P \times \begin{pmatrix} x' \\ y' \\ 1 \end{pmatrix} \qquad \text{Eqn (9)}$$

In three dimensions this is extended by using computer readable fiducial markers that extend into three dimensions, for example two Apriltags® as shown in FIG. 1. These are not in the sample 2D plane, and therefore can be used to define a xyz coordinate system in 3D. Where there are two or more computer-readable fiducial markers in this way, both the point array of the specimen surface generated by photogrammetry and all but one of the coordinate systems defined by the CRFMs are referred to one single coordinate system for one of those CRFMs via linear transformations;

$$x = x(x', y', z'), y = y(x', y', z'), z = z(x', y', z') \qquad \text{Eqn (10)}$$

Reduction to Practice II: Prototype Software Components

A system ("N") has been prototyped and described above using components from several sources:

(a) Apriltag® recognition software[e.g. 14] in C++(for the recognition of Apriltags® in steps 4 and 7 above)

(b) Autoit®[15] (for implementation of a small GUI (step 3 and others) to ask the name of sample and point, screen capture to a file in steps 4 and 7, and running components (a), (c) and (d) in the right order on the right files)

(c) Imagemagick®[16] (for conversion of file formats between the .png files and .jpg files used by (a) and (b). Also for contrast enhancement or inversion when this is necessary due to the limitations of the microscope contrast mechanisms. I have chosen the "portable 32-bit" version as this aids use on a portable USB drive, and some instrument operating software still uses 32-bit Microsoft® Windows®.

(d) gInk®[17], for screen annotation.

DETAILED DESCRIPTION

Suppose in an analytical facility, perhaps attached to a university or commercial company, there may be 100 different analytical instruments perhaps 100 staff members and perhaps 3,000 users. The users may be university researchers, research staff of a company or others. Each user typically needs access to 3 or 4 different analytical instruments of the 100 on offer. Say a particular user needs to perform Scanning Electron Microscopy (SEM), Energy Dispersive X-ray Analysis (EDS) and x-ray photoelectron spectroscopy (XPS) on a set of 10 samples from a study of different catalysts. This is a very typical case.

Figure 1:
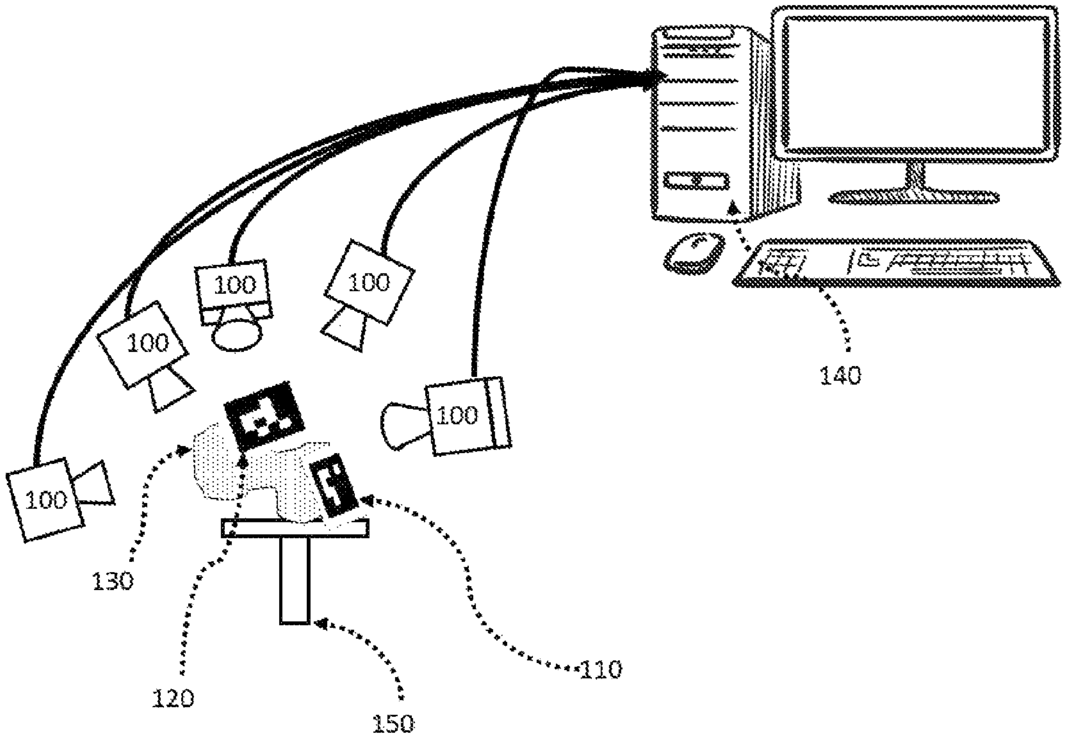
FIG. 1 shows a scanning system (also called as Digital Analytical Twin Scanner) for analysis of a specimen (130), comprising one or more (in this illustrated case five) cameras (100), specimen (130), sample holder (150), Computer Readable Fiducial Markers (CRFDs) (110 and 120) and the computer operating this system (140)
Figure 2:
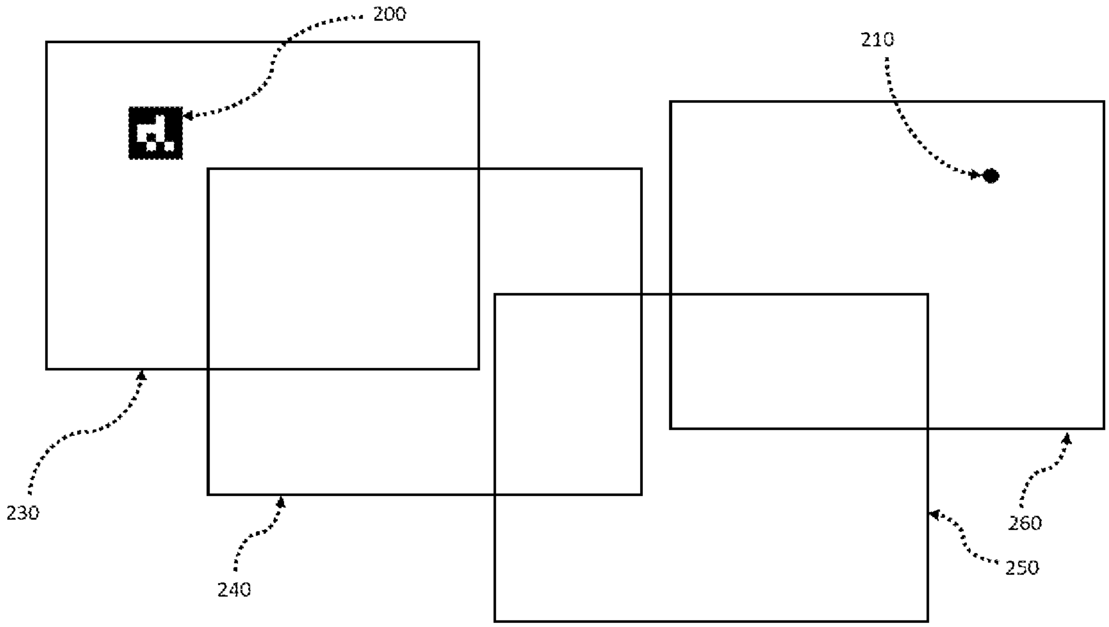
FIG. 2 shows how PARS indicates a point (210) outside the initial field of view (230); intermediate fields of view (240 and 250) are used by correlating random features of the specimen surface (not shown) within these fields of view so that the position and orientation of the field of view (260) that includes the point of interest is in a known location with respect to Computer Readable Fiducial Marker (CRFM) (200)
Figure 3:
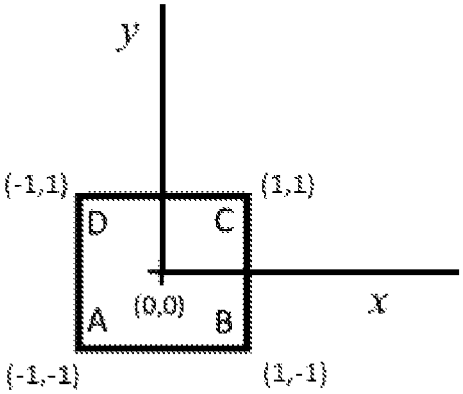
FIG. 3 shows a schematic representation of an square fiducial marker on the x,y coordinate plane.
Figure 4:
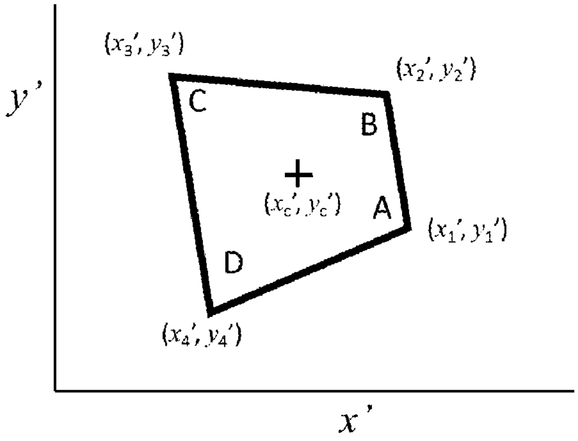
FIG. 4 shows a representation of a square fiducial marker in a different orientation in the x',y' plane, as the said marker of FIG. 3 may look in a different instrument with the x',y' coordinate system.
Figure 5:
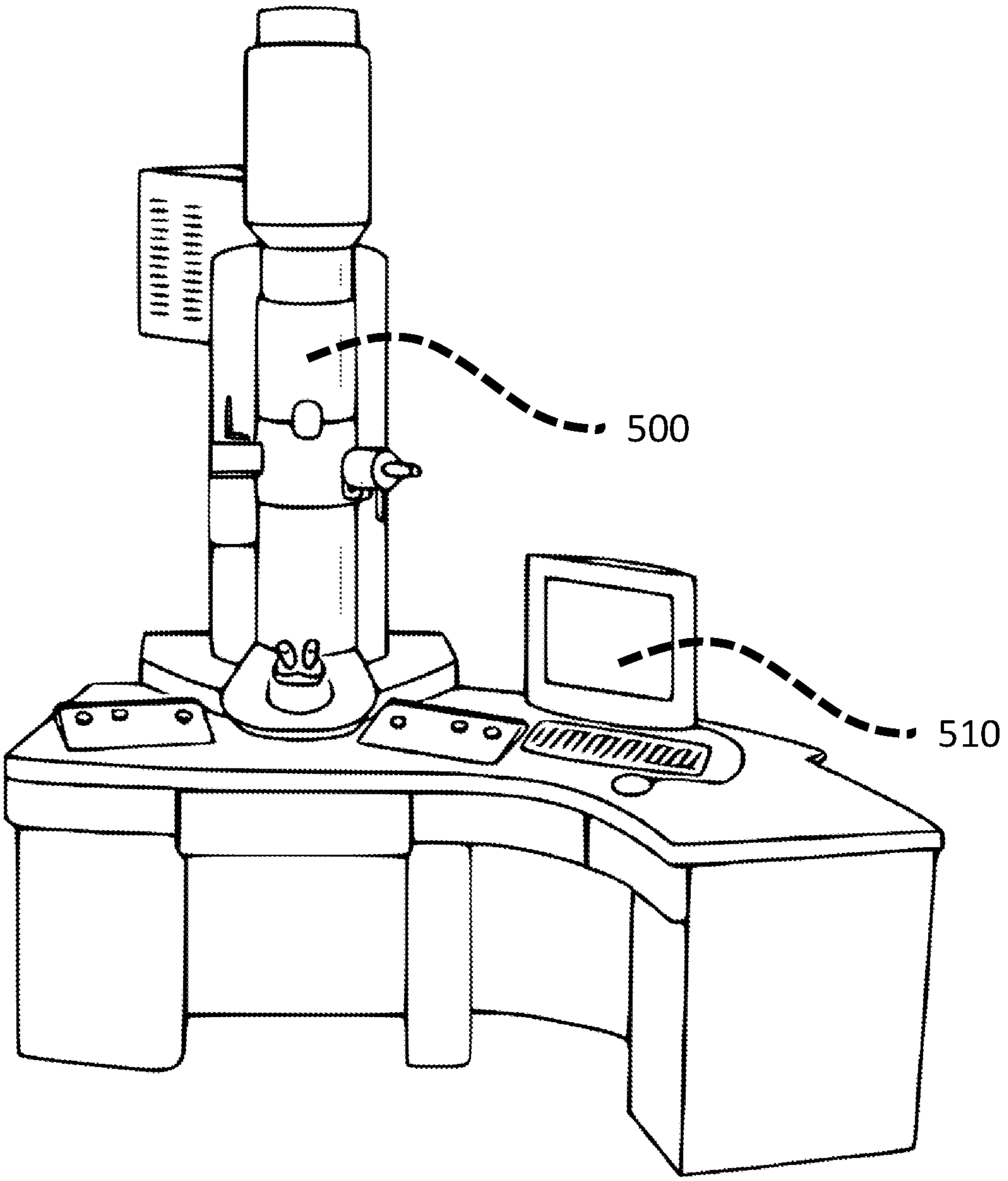
FIG. 5 shows a typical Transmission Electron Microscope (TEM) comprising electron column (500) and computer operating the microscope (510)
Figure 6:
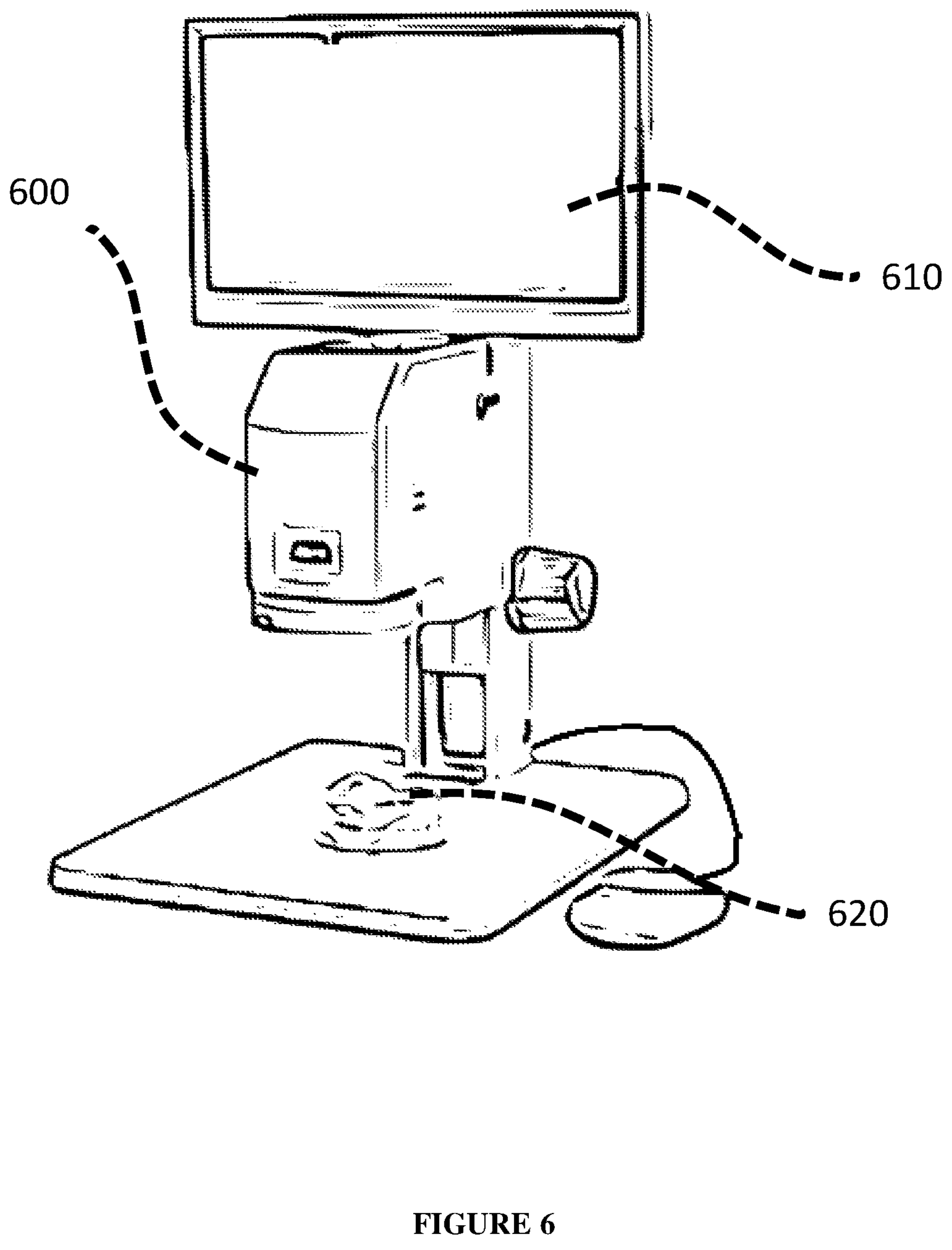
FIG. 6 shows a typical wide-field optical inspection microscope optics (600) having a built-in monitor (610) that has a computer operating the microscope within it, for light microscopy on a specimen (620)
Figure 7:
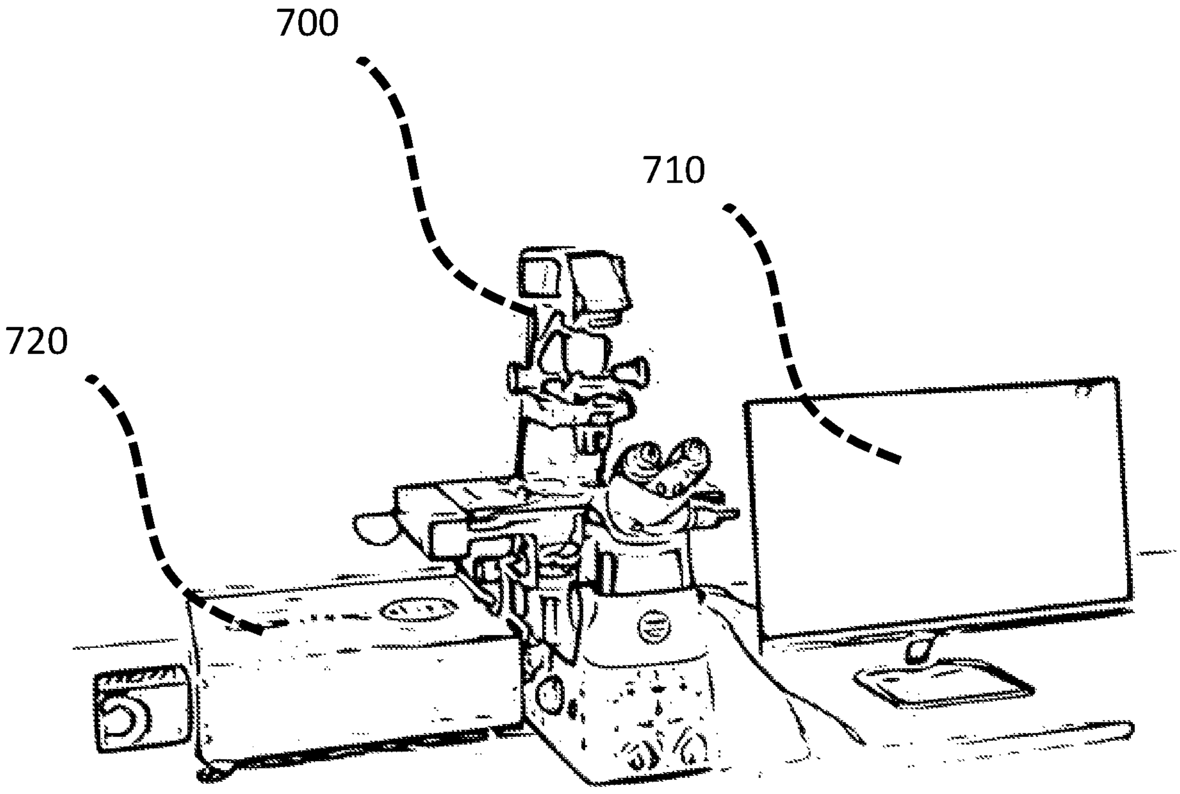
FIG. 7 shows a typical confocal optical microscope having very high spatial resolution, comprising microscope column (700), light source (often a laser) (720) and computer operating the microscope (710)
Figure 8:
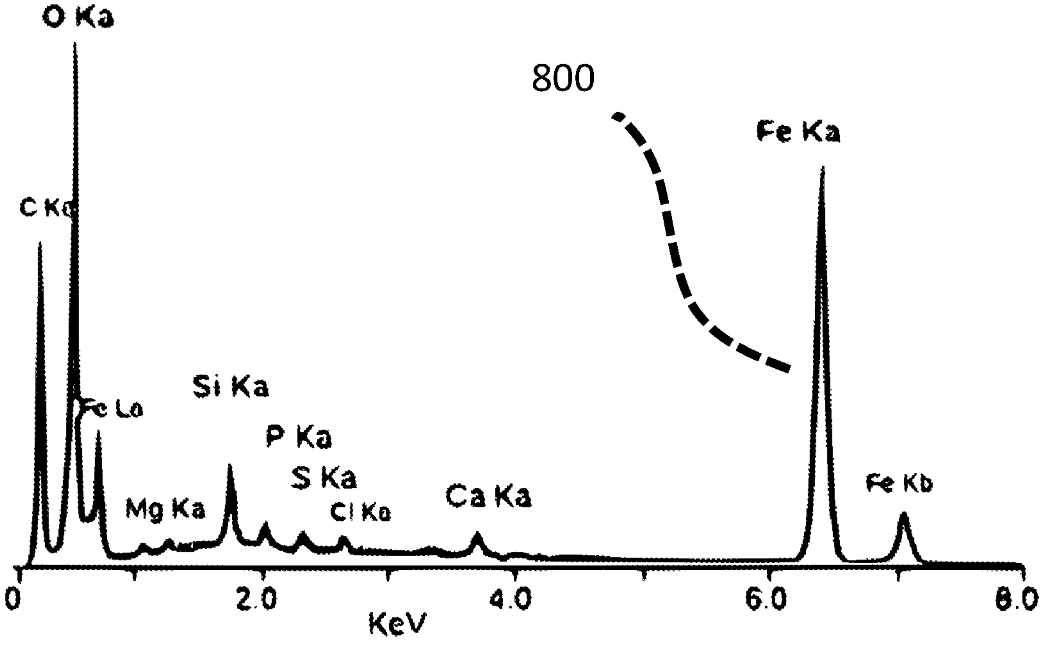
FIG. 8 shows a typical Energy Dispersive (x-ray) spectrum (EDS) comprising many peaks representing the presence of many elements within the sample, including iron (800)
Figure 9:
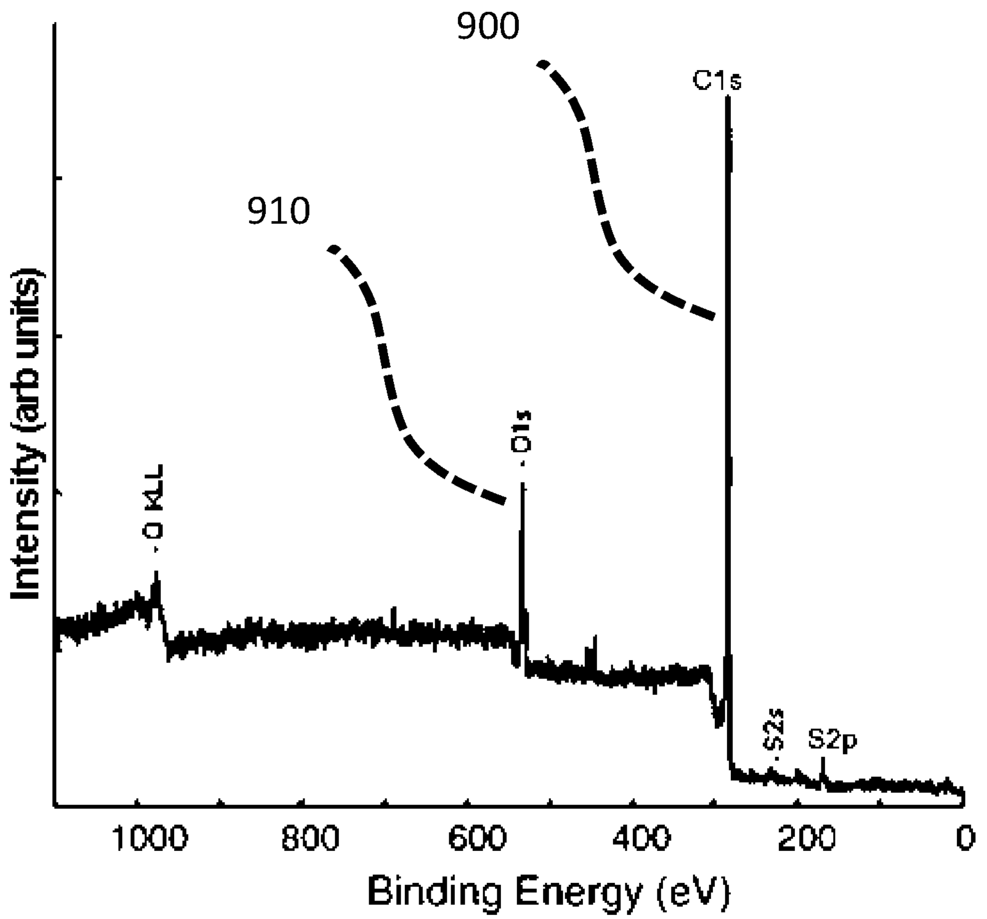
FIG. 9 shows an x-ray photoelectron spectroscopy spectrum comprising many peaks representing the presence of several elements within the surface of the specimen, including carbon (900) and oxygen (910)
Figure 10:
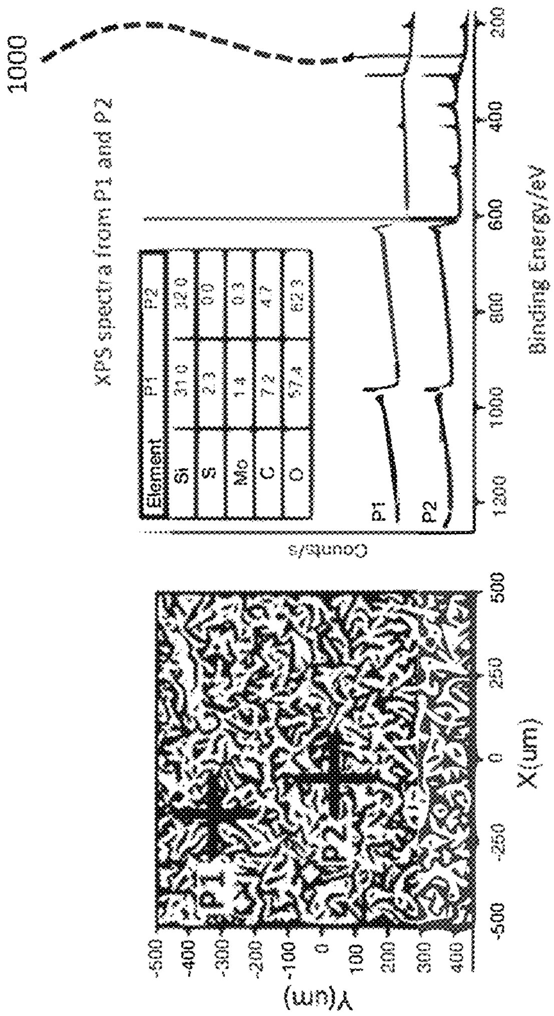
FIG. 10 shows a typical screen presented to an operator of an XPS instrument, in which there are two important analytical points of interest on the surface (P1 and P2) and spectra taken from those points (1000).
Figure 11:
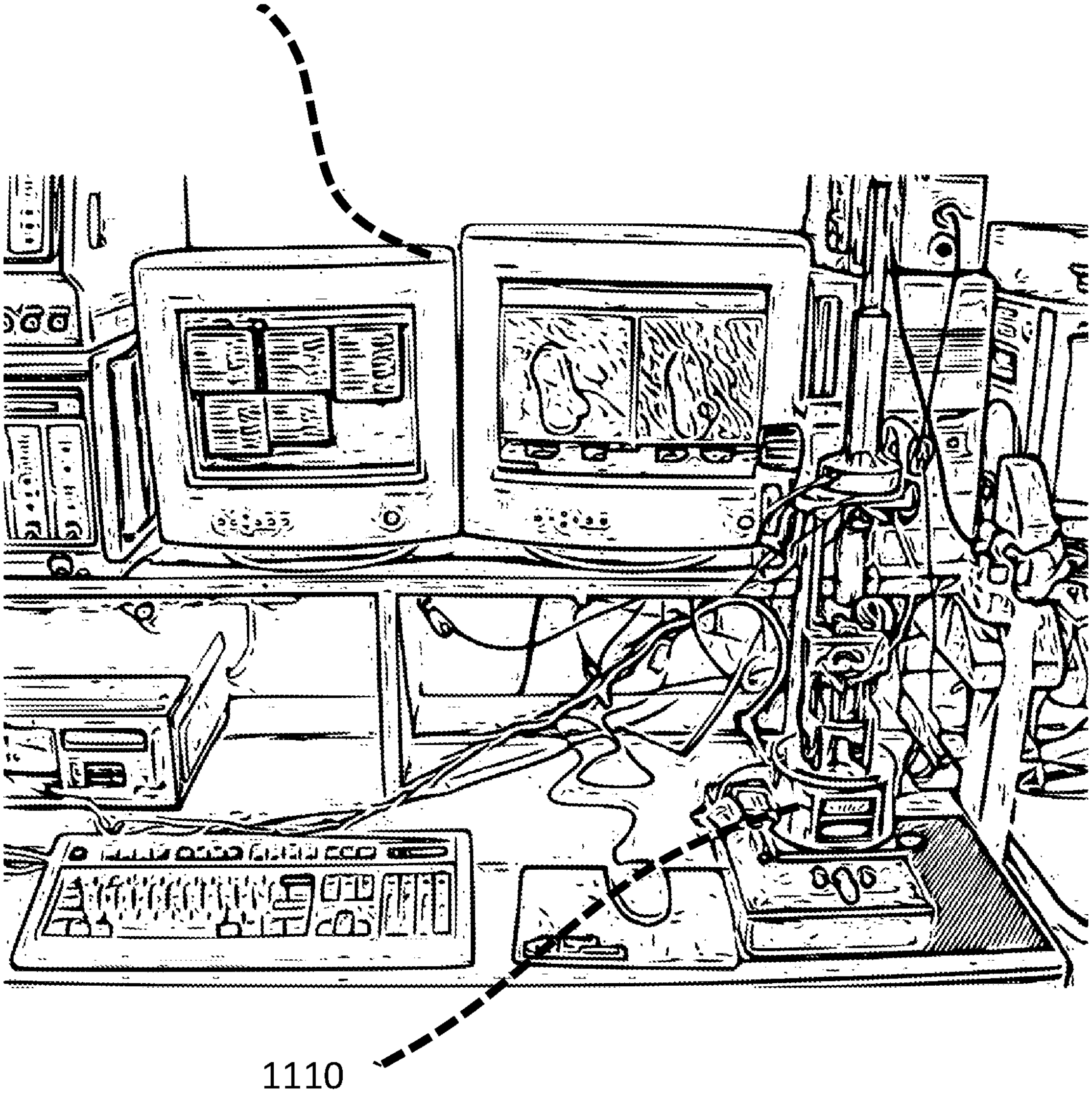
FIG. 11 shows an Atomic Force Microscope (AFM) (1110) and the computer that operates it (1100)
Figure 12:
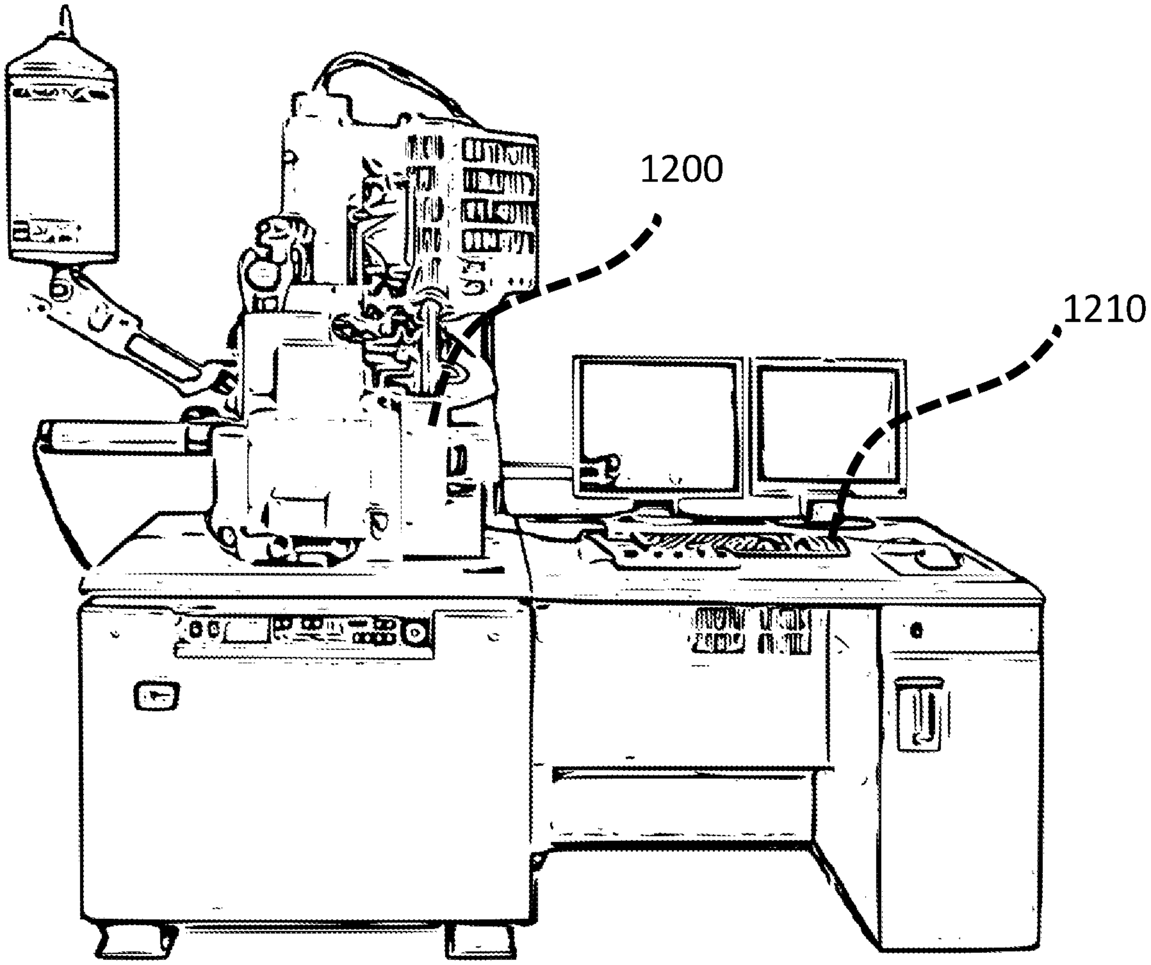
FIG. 12 shows a conventional scanning electron microscope (SEM) comprising an entry-lock through which samples are admitted (1200) and the computer that operates the SEM, (1210)
Figure 13:
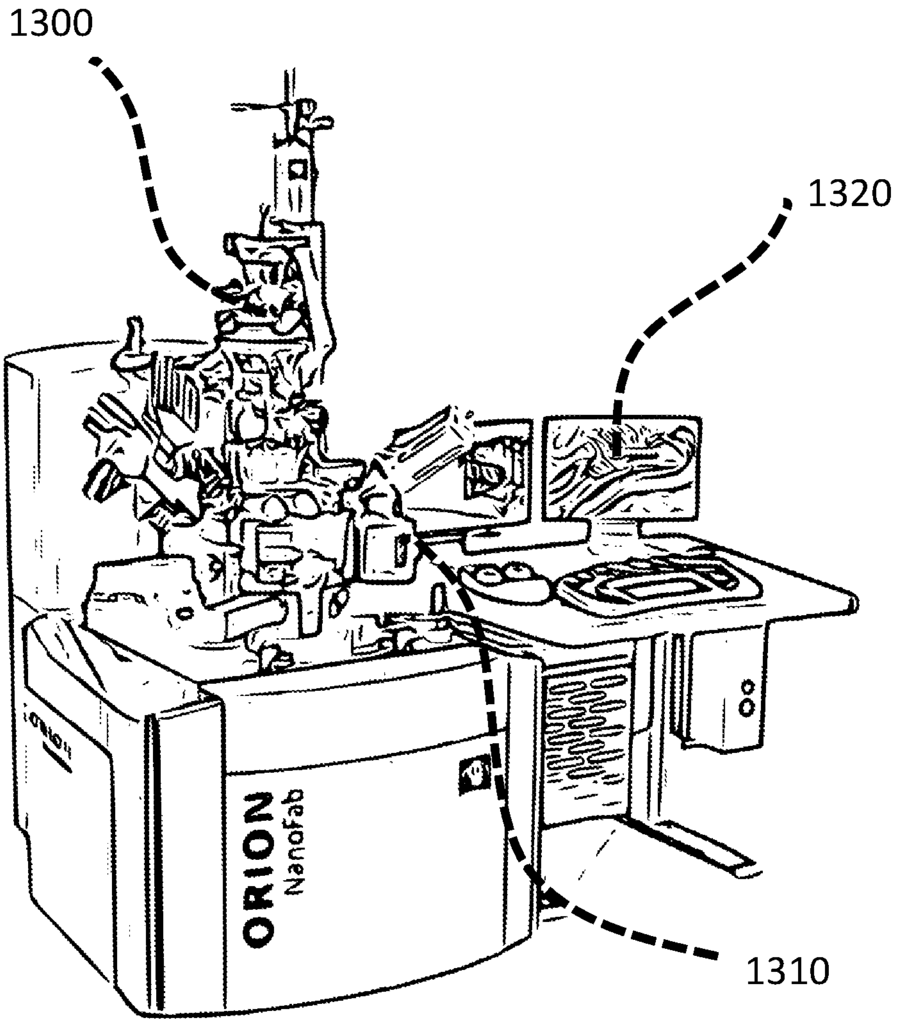
FIG. 13 shows a state-of-the-art Helium Ion Microscope (HIM) comprising helium ion column (1300), entry lock (1310) and the computer that operates the HIM (1320)
Figure 14:
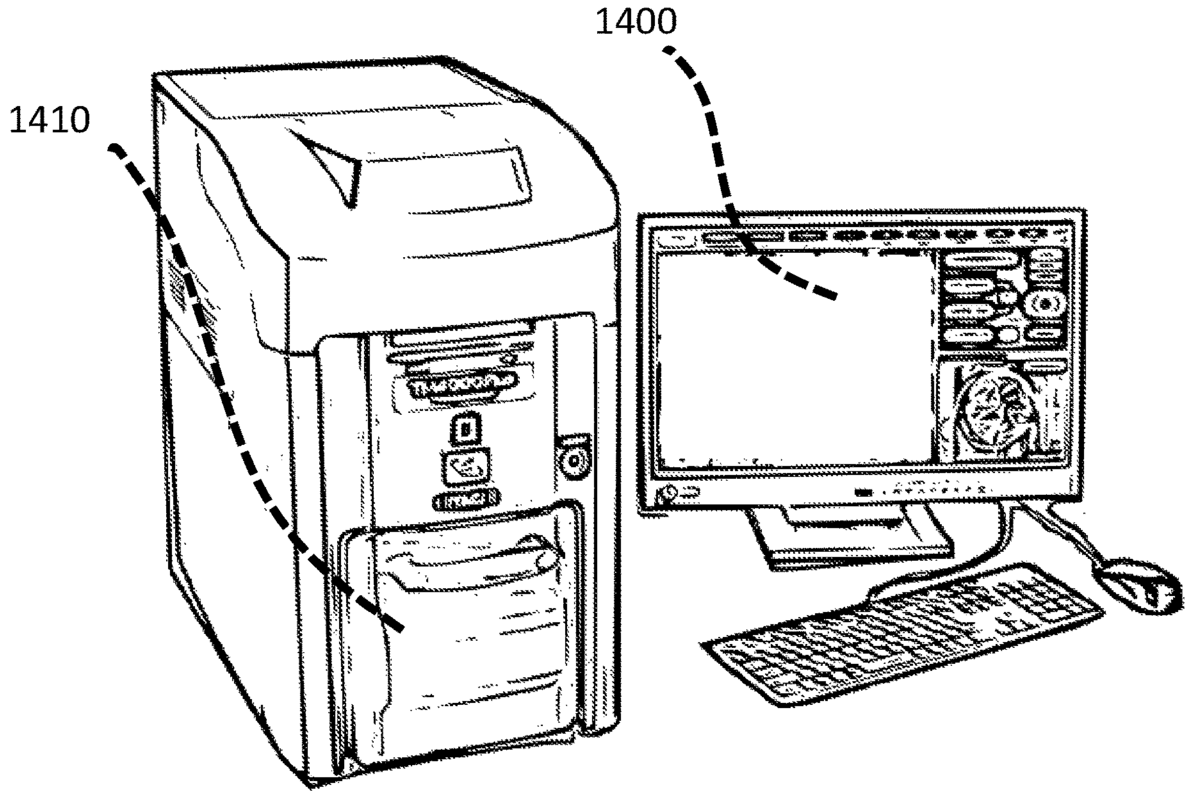
FIG. 14 shows a typical "Benchtop" scanning electron microscope (SEM) including the vacuum chamber (1410) and the computer that operates the SEM (1400)
Figure 15:
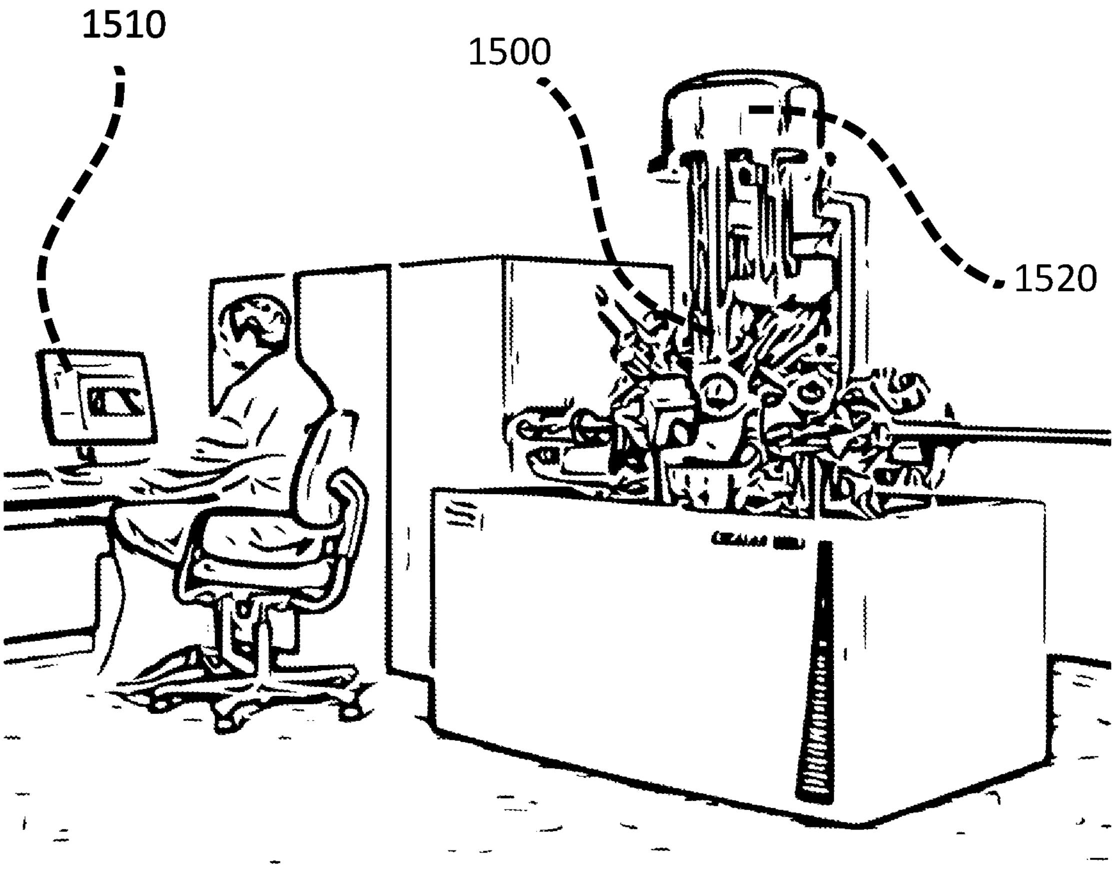
FIG. 15 shows a typical x-ray photoelectron spectrometer (XPS), with hemispherical analyser (1520) and analysis chamber (1500) with operator seated and planning XPS analysis using the software running on a computer (1510) that operates the XPS instrument.
Figure 16:
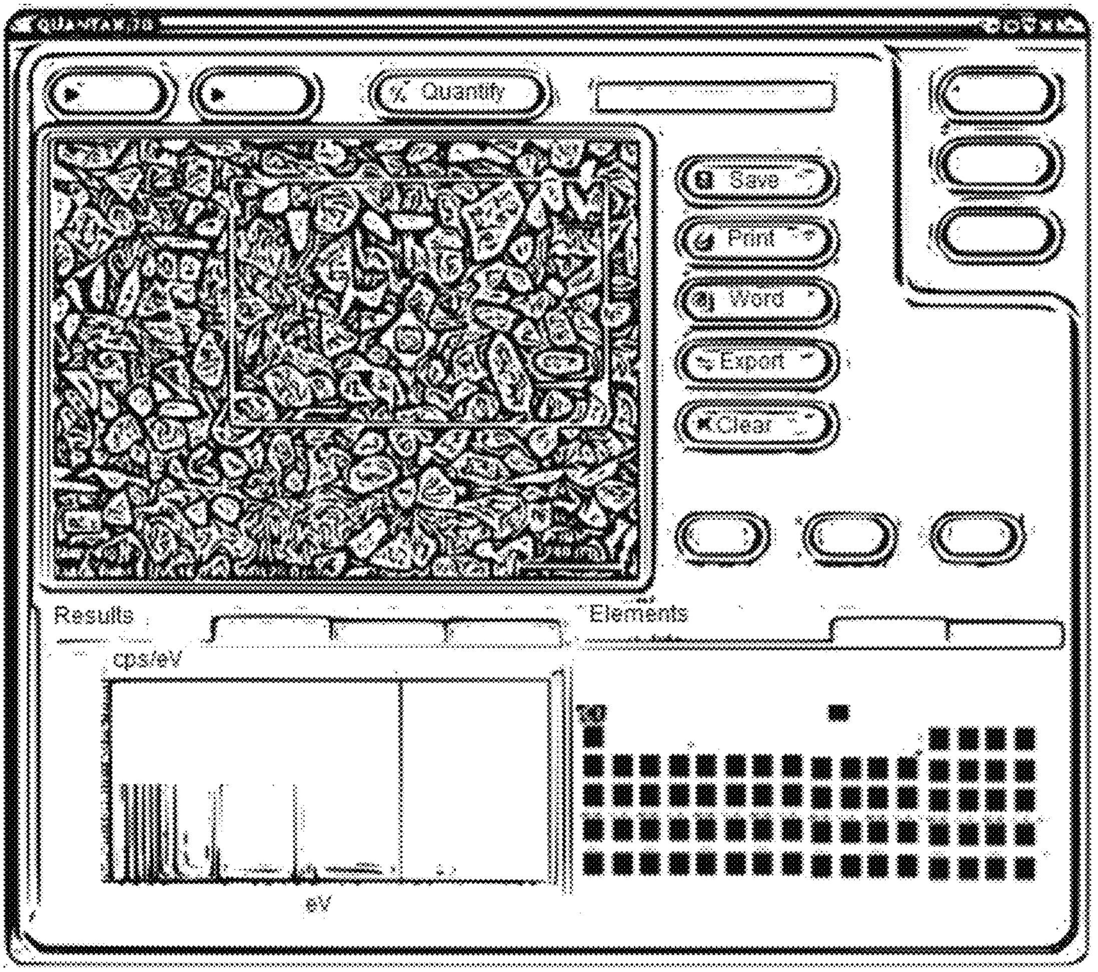
FIG. 16 shows the screen of a computer operating a scanning electron microscope or SEM (in fact the benchtop SEM shown in FIG. 14) including the optical "plan view" of the sample.
Figure 17:
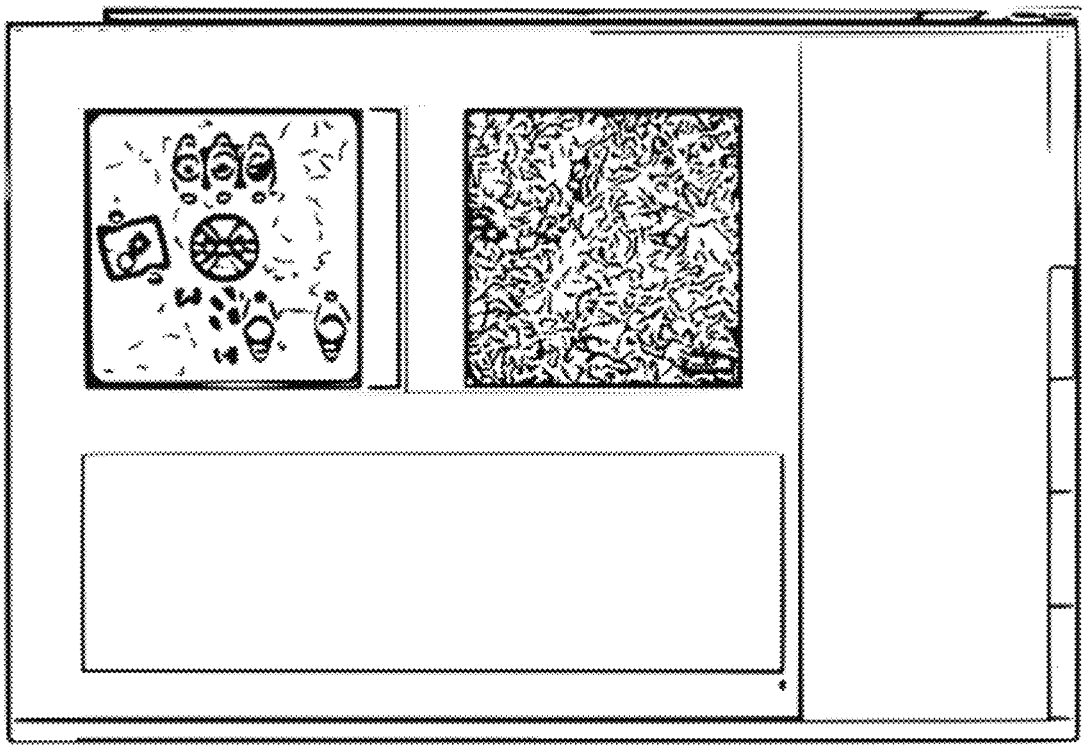
FIG. 17 shows the screen of a computer operating an x-ray photoelectron spectrometer including the optical "plan view" of the sample.
Figure 18:
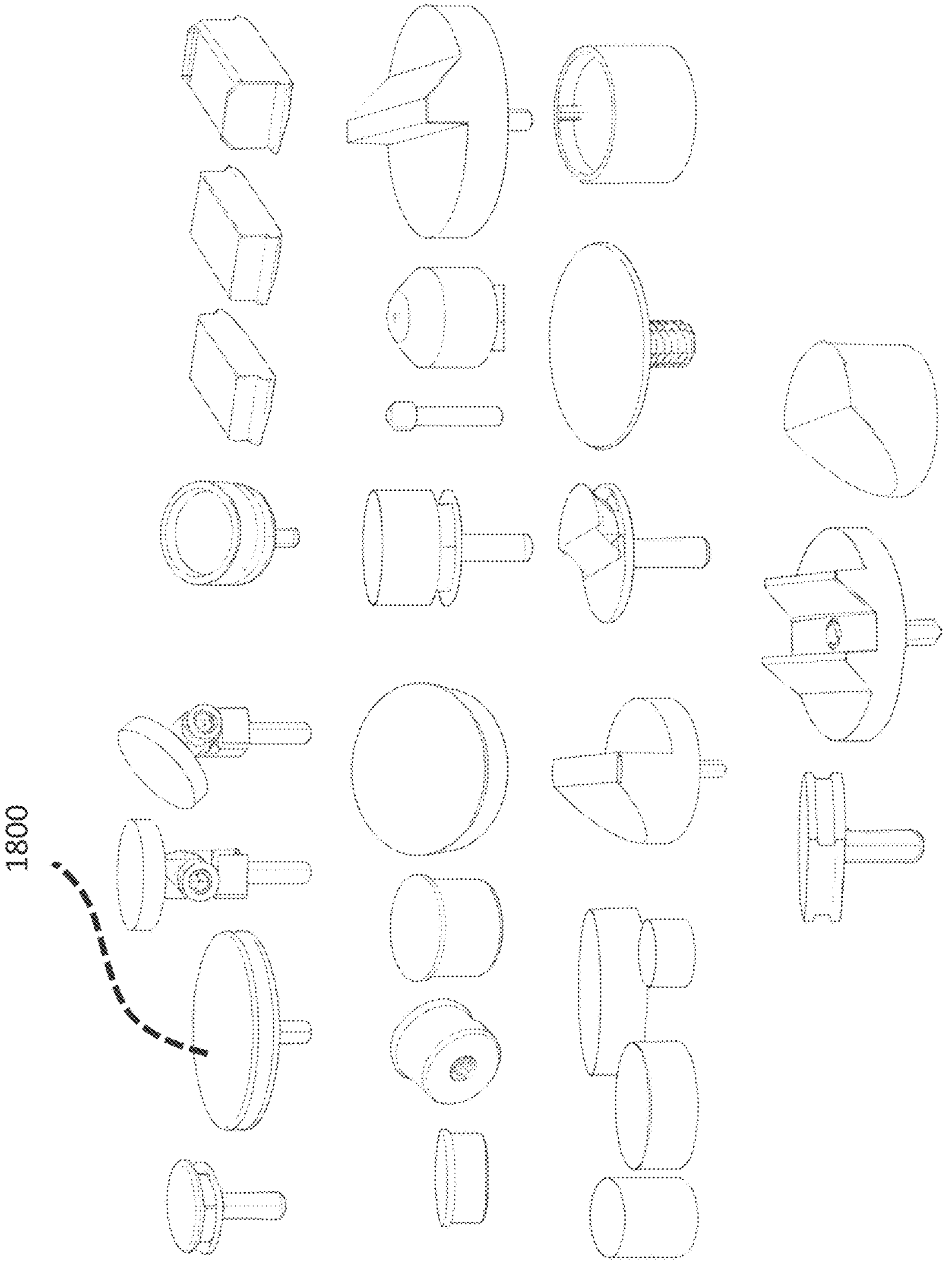
FIG. 18 shows a variety of different kinds of sample holder used in analytical instruments such as scanning electron microscopes, including the "pin stub" (1800) of the type used in some of the experimental studies I have carried out.
Figure 19:
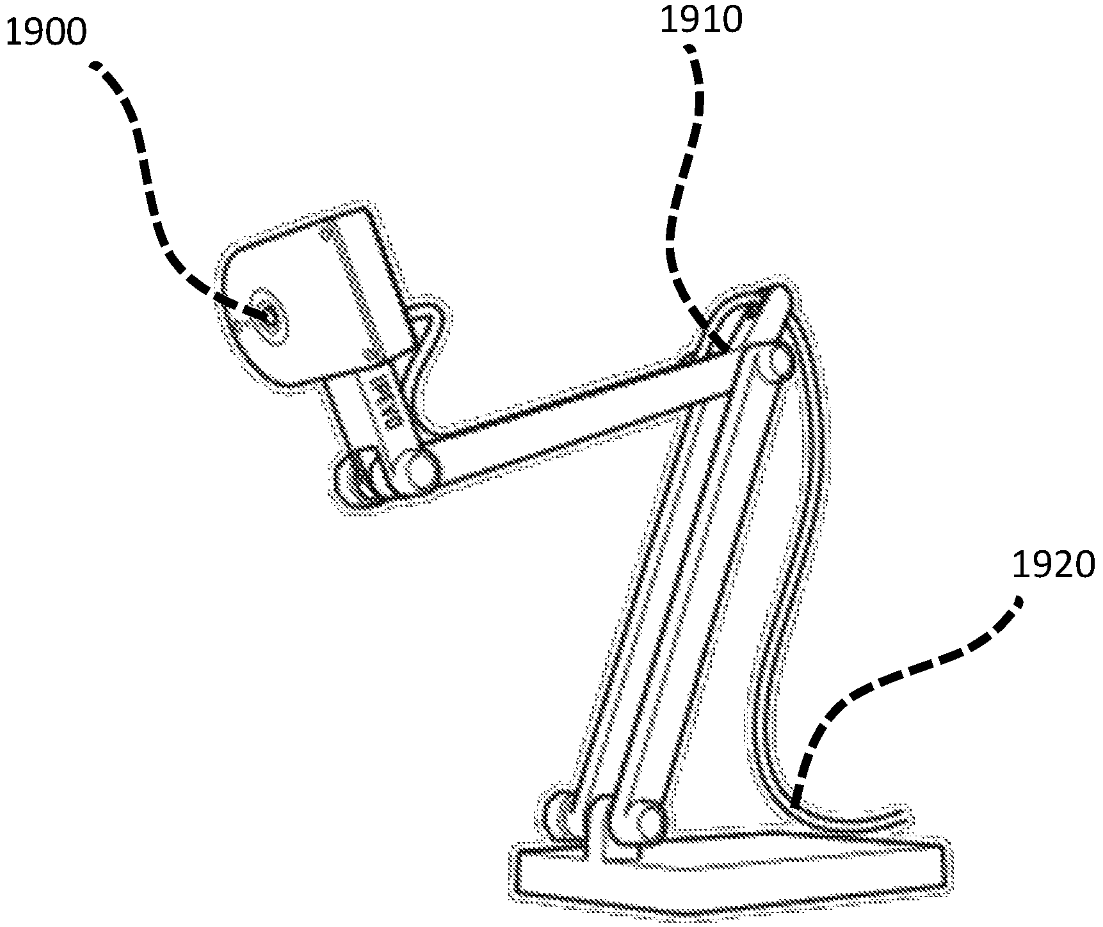
FIG. 19 shows a digital camera manufactured by the Ipevo® company (model V4K) that has successfully been used as part of the scanning system (or the DAT scanner) shown in FIG. 1, comprising a CMOS optical camera sensor (1900), adjustable stand (1910) and USB cable (1920) by which means images are transmitted to a computer.
Figure 20:
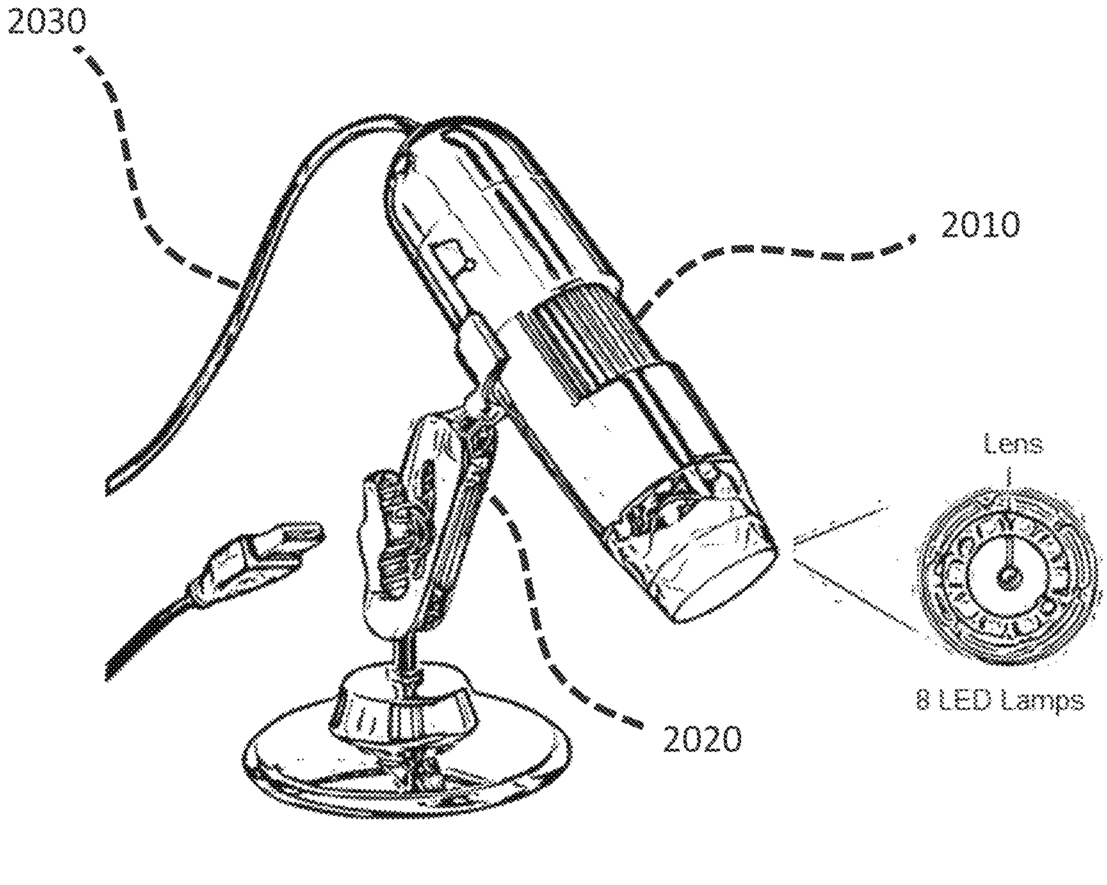
FIG. 20 shows a generic, inexpensive digital microscope of a type widely-available, and which is successfully been used as part of the scanning system (or the DAT scanner) shown in FIG. 1, comprising a stand (2020), focusing dial (2010) and USB cable (2030) by which means images are transmitted to a computer.
Figure 21:
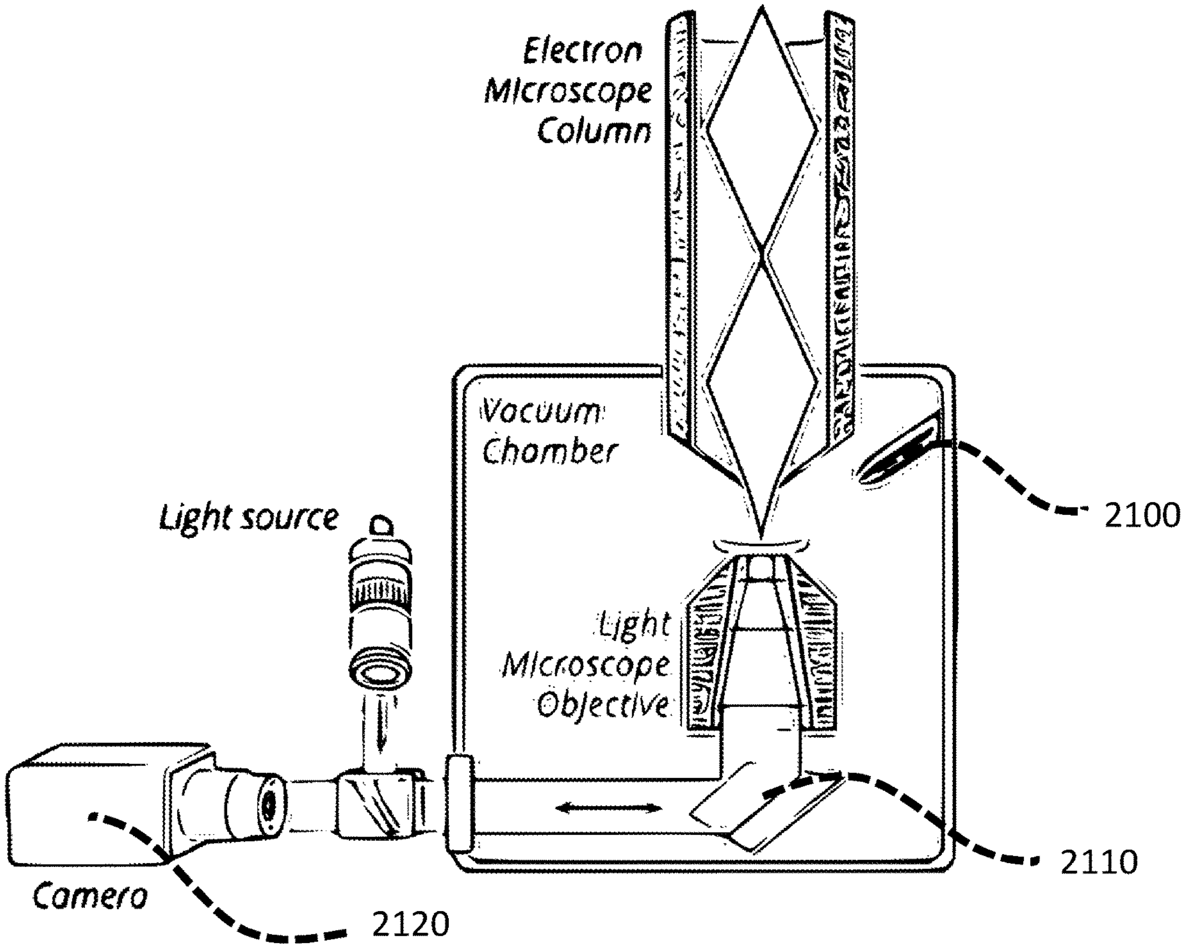
FIG. 21 shows schematically how an optical microscope and electron microscope may be combined into a single instrument, including an optical camera (2120), mirror (2110) and secondary electron detector (2100)

For the sake of this example embodiment, let us assume that the user works some distance from the central facility where the analytical work is to be done, perhaps in Leeds in the UK. Optionally, the first thing the user does is to mount each sample on a separate sample holder, each of these holders having a unique computer-readable fiducial marker, such as a QR code, some barcode markers or an Apriltag®. No great care has to be taken to place or orient the sample with respect to these fiducial marker(s) on the holders. Instead, optionally, a Digital Analytical Twin Scanner (DATS) such as that shown in FIG. 1 is used to scan each sample, and for each creates a Digital Analytical Twin (DAT) file, a computer data structure in which images captured of the sample are held with information on the orientation and location of those images with respect to the computer-readable fiducial markers. Indeed these said markers will be visible in at least one of those images. The DAT data structure may conveniently be stored on a USB memory stick, or a portable USB drive, or equivalently at a particular location on a networked drive or cloud storage. Optionally this storage (for example the USB memory stick) also contains the PARS software in executable form (what is sometimes called a "portable application"). All this can be done at the user's own laboratory in Leeds, which may be far from the central analytical facility that the user intends to use (perhaps in London). The scanning system (or the DAT Scanner) that the user uses in his or her own laboratory may be much cheaper than the instruments and microscopes at the central facility. The scanning system for typical sample sizes is probably a table-top sized instrument that is easy to accommodate in a laboratory, or even an office. In some cases though, if the samples are larger, the scanning system may be much larger.

At this point the user may review the images and choose points or areas that he or she wishes to study by SEM, EDS or XPS. These points of interest (POIs) or regions of interest (ROIs) are recorded in the Digital Analytical Twin (DAT) data structure by the PARS software (which performs the kind of coordinate transformations described in Equation's 1-9 above to do so). When the user takes the USB memory stick to the SEM instrument (perhaps at a central facility many miles from his or her own laboratory, in London for example), the user looks for one or more computer-readable fiducial markers (CRFMs) on the screen. The PARS software (running alongside the SEM acquisition software, but accessing only the screen displayed to the user) automatically recognizes those CRFMS when they appear on the computer screen, and adds an annotation to the screen where POIs or ROIs have previously been made, making use of the photogrammetry-derived model and the coordinate transformations Equation's 1-9 in doing so. The user can see these POIs and ROIs marked and annotated on the screen (even if the computer running the SEM has no information about them). The user may add more POIs or ROIs to the DAT data structure now that the SEM displays an image of the surface. This could be done by, for example, the user clicking the computer mouse at particular locations. The PARS software will capture these, and calculating the 3D location of those points with respect to the CRFM(s), record them in the DAT data structure. These images can be captured by the PARS and stored in the DAT data structure. The user can navigate the field of view of the SEM instrument, using the SEM controls, to POIs or ROIs that appear on the screen as annotations.

The user then goes on to perform EDS at some of the POIs. The EDS spectrum is recorded and either the spectrum file itself, or a link (such as a unique filename) to that spectrum file is stored in the DAT as associated with that POI. EDS can typically be performed in an SEM instrument.

Figure 22:
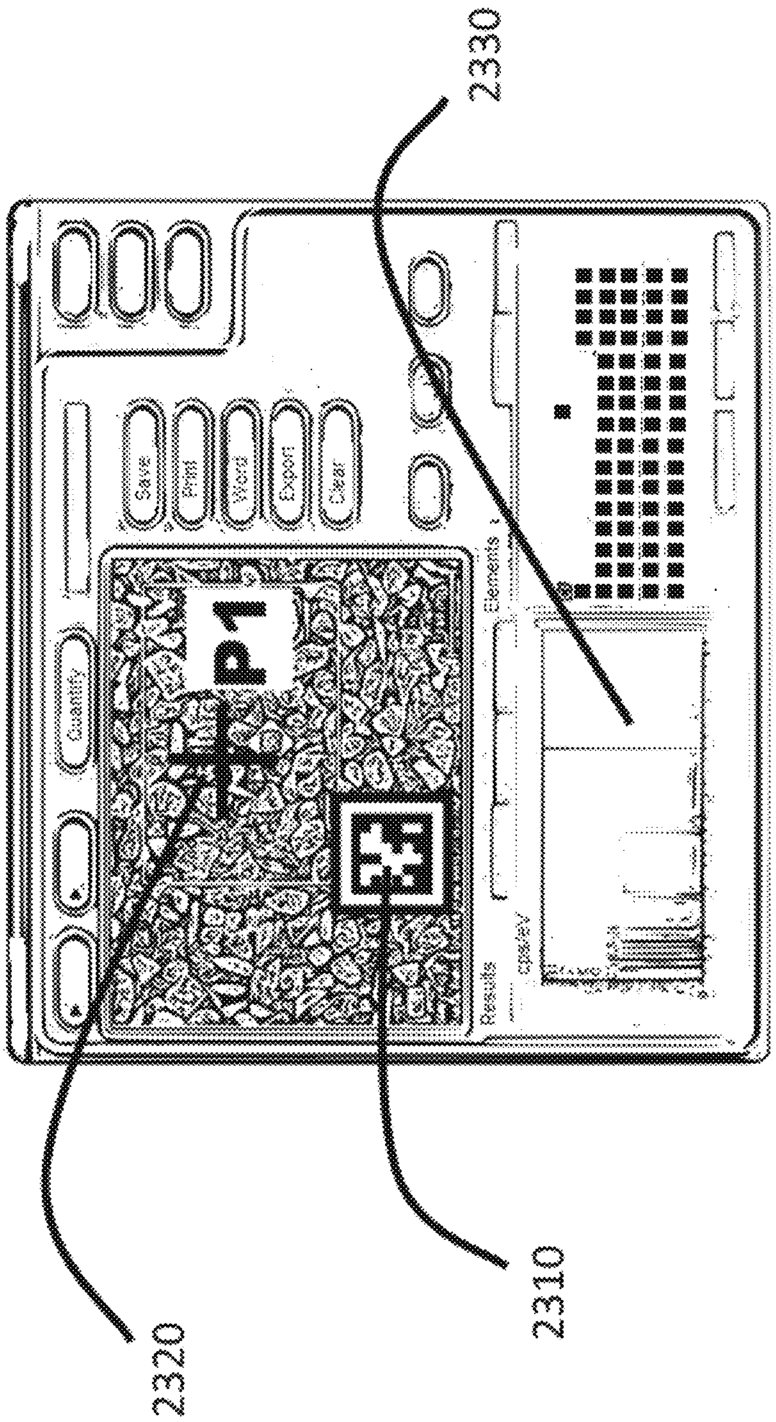
FIG. 22 shows schematically the screen of a computer operating a Scanning Electron Microscope, including a Computer Readable Fiducial Marker (2310) that has been etched into the specimen surface using a Focused Ion Beam, a point (labelled P1) on the surface of the specimen (2320) defined by the user, and the Energy Dispersive x-ray Spectrum (EDS) from that point (2330)

Knowing that he (or she) is about to take a specimen to a different instrument, the user uses a focused Ion Beam (FIB) to mark a specific location nearby the POIs with a new CRFM that will be visible in the next instrument to be used. The view that the user will see on the screen of the computer operating the SEM is shown schematically in FIG. 22.

Figure 23:
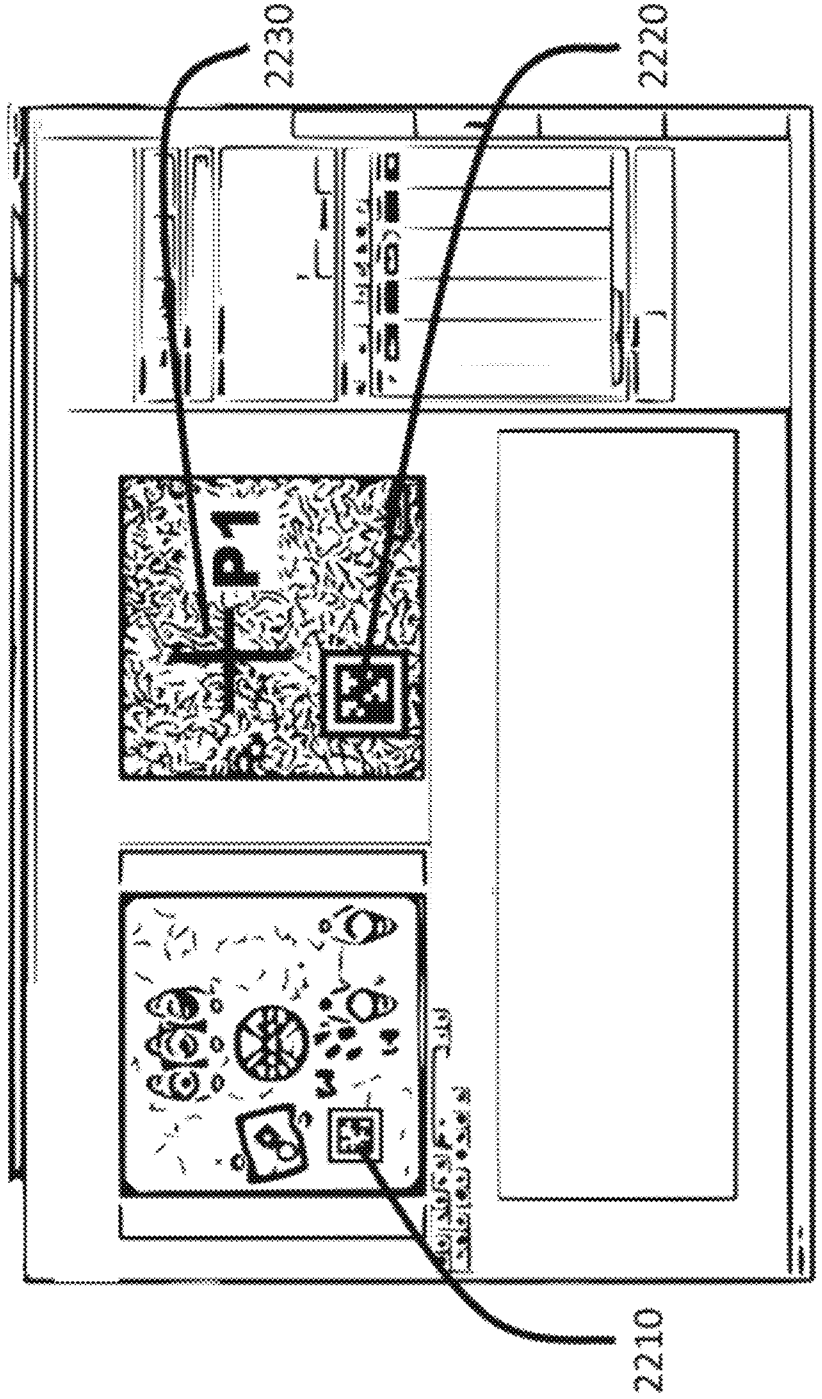
FIG. 23 shows schematically the screen of a computer operating an x-ray photoelectron spectrometer (XPS), including a Computer Readable Fiducial Marker, CRFM, (2210) attached to the sample holder, a different CRFM (2220) that has been focused ion beam etched into the sample surface in another instrument (the SEM as shown in FIG. 22) and a position marker (2230) overlaid on the screen by the PARS software, indicating the point that the user marked in the SEM as shown in FIG. 22.
Figure 24:
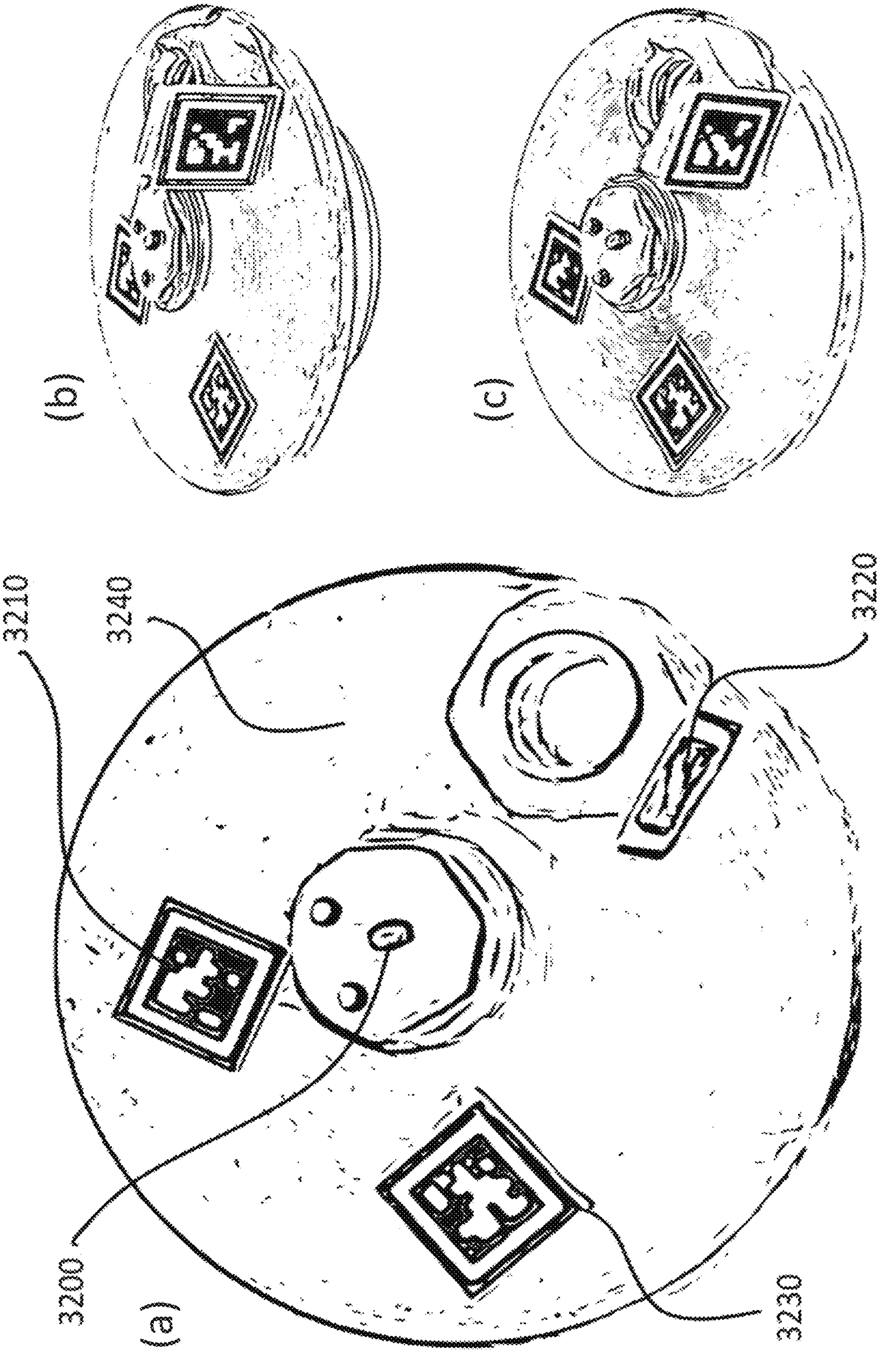
FIG. 24 shows one experimental arrangement of Computer Readable Fiducial Markers (CRFMs) (3210, 3220 and 3230) on a sample holder viewed from three different angles (a), (b) and (c), the sample of interest being an electronic device (3200) firmly-fixed to the sample holder.
Figure 25:
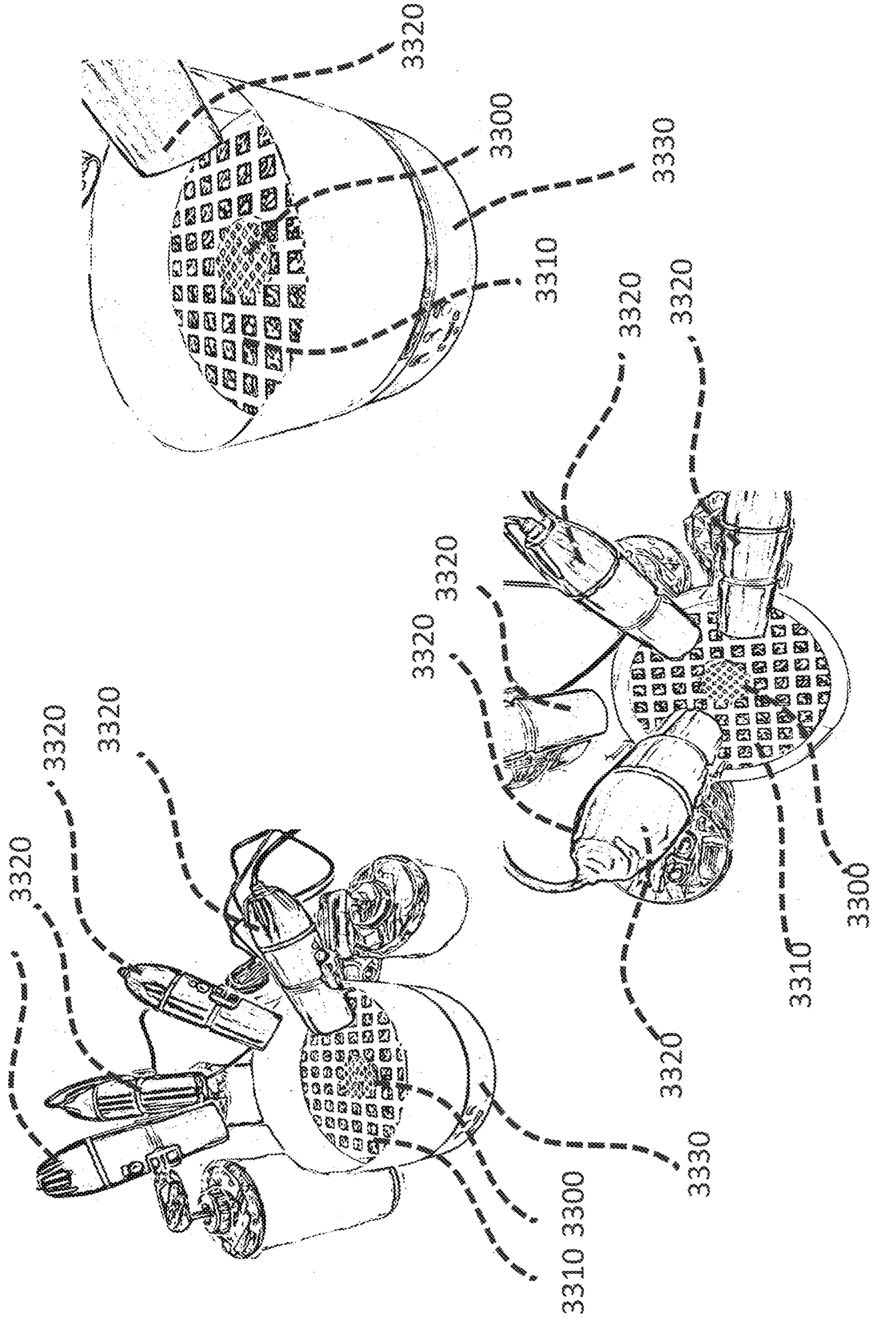
FIG. 25 shows three views from different angles of an experimental arrangement of an array of CRFMs affixed to sample holder (3300) and another distinguishable array of CFRMs (3310) attached to a motorized rotating stage (3330), cameras (3320) of the type shown in FIG. 20, this being one embodiment of the system shown schematically in FIG. 1; and all in accordance with an embodiment of the disclosure.

The user then takes the specimen, and the USB memory stick containing its DAT, to another instrument entirely, the x-ray photoelectron spectrometer (XPS). This might be in Newcastle-upon-Tyne for example. The user uses XPS mapping to chemically image the region containing some POIs and the FIB CRFM. This CRFM allows the user to define POIs with greater accuracy and repeatability because it is small in scale and close to the POIs. The user then records XPS spectra from some of the POIs and these spectrum files are stored (or linked to) associated with the positional coordinates of those POIs within the DAT for the specimen, on the USB memory stick. FIG. 23 shows schematically the screen that the user will see when using the XPS instrument computer. Note the FIB milled CRFM (2220) and the overlaid screen annotation (2230) generated by the PARS software to indicate a point that the user previously defined in the SEM. The PARS software calculates where to place this annotation and label "P1" based on recognizing the CRFM (2220) direct from the screen of the computer.

Later (possibly months or even years later) the user can review the results of analysis of the specimen using the USB stick and his or her own personal computer (having no need for any analytical instrument to be connected to it). Writing-up results for a paper or industry report the user can navigate across the images required, and analyze spectra quantitatively while knowing the coordinates from where those spectra originated on the specimen. The user may produce a 2D or 3D digital rendering of the specimen, based on imaging from DATS and/or SEM and/or EDS and/or XPS, perhaps overlaid in false color imaging to emphasis particular chemicals present.

Some of the advantages in the user doing this work using PARS, DAT and DATS are that preparation can be made cheaply in the users own laboratory using a DAT scanner (DATS) rather than the much more expensive time of an instrument such as an SEM or XPS, potential errors in describing POIs or ROIs can be avoided, the analytical data is stored in a form that has a one-to-one correspondence with the specimen, making it easy for the user to generate views of the specimen with overlaid analytical data that will be meaningful to any expert in that specimen, even if they are not experts in the analytical techniques, the DAT data structure can be standardized and agreed upon by an analytical facility or more widely, whereas hand annotations of photos in a lab-notebook cannot, and remote collaboration can be promoted by being able to display DAT information in different ways in a teleconference or "Zoom®" meeting, without taking up time on the expensive SEM or XPS or other instrument to do so.

This invention has a number of new features compared to prior art, including (but not necessarily limited to) the following;

(a) The PARS software operates only via the images displayed on a screen, finding, recognising and locating Computer Readable Fiducial Markers within those images, and therefore can operate as a third-party piece of software (not necessarily coming from the company that sold the software operating the analytical instrument).

(b) The DAT scanner is a new device having the task of originating a DAT model of a sample by photogrammetry of that sample (and attached Computer Readable Fiducial Markers) from more than one (and typically several) angles. It is not just a photogrammetry scanner (of which there are several good examples [25,26] of prior art in the literature), it adds the automated recognition of CRFMs and creates xyz coordinate system defined by those CRFMs in which the points defining the (photogrammetry-determined) surface of the specimen are placed.

(c) A Digital Analytical Twin (DAT) as described above is different from the Digital Twins[19] in current use because the DAT does not originate with the CAD or CAM model of a manufactured item or building, but is created empirically by photogrammetry from an the specimen that may be manufactured or found (e.g. an archaeological artefact or natural object such as a meteorite). A digital twin can and does often exist before there is a physical entity, but a DAT cannot. The use of a digital twin in the create phase allows the intended entity's entire lifecycle to be modelled and simulated[19]. There is no such thing as a DAT at the point of creation of the object; it must be created by photogrammetry or other measurement technique(s). The DAT begins with a physical object and allows the object's analytical lifecycle to be modelled and simulated, including damage to data obtained by some techniques as a result of those applied previously.

The DAT data structure can be realized in many different ways, one example being an Extensible Markup Language (XML) file[20]. This allows the tools already developed for parsing and checking XML files to be applied to DATs. Within this structure, particular (proprietary or open) analytical data formats may be used to represent spectra, images, or other analytical data about the sample.

```
<?xml version="1.0" encoding="UTF-8"?>
<Digital__Analytical__Twin>
  <Sample__Identifier>Sample number 12345</Sample__Identifier>
        <Owner>Dr A B Smith</Owner>
        <topography>
          <topography__file>s31987.stl</topography__file>
        </topography>
    <images>
          <image__001>DATSimage1.jpg</image__001>
    <image__002>DATSimage2.jpg</image__002>
    <image__003>DATSimage3.jpg</image__003>
    </images>
```

-continued

```
    <Computer__Readable__Markers>
    <Marker__001>
          <type>Apriltag</type>
          <Marker__Identity>45</Marker__Identity>
<x>22.54</x>
    <y>82.1</y>
    <z>-18.54</z>
    <theta>22.1</theta>
    <phi>-193</phi>
    </Marker__001>
    <Marker__002>
          <type>Apriltag</type>
          <Marker__Identity>59</Marker__Identity>
    <x>54.96</x>
    <y>2.12</y>
    <z>12.32</z>
    <theta>-3.5</theta>
    <phi>19.5</phi>
    </Marker__002>
      </Computer__Readable__Markers>
      <Analytical__Locations>
    <Analytical__Location__001>
    <x>432.45</x>
    <y>543.92</y>
    <z>-183.23</z>
    <EDS__spectrum>E98765.eds<EDS__spectrum>
    </Analytical__Location__001>
    <Analytical__Location__002>
    <x>32.545</x>
    <y>-53.13</y>
    <z>1.83</z>
    <XPS__spectrum>S12345.vms<XPS__spectrum>
    </Analytical__Location__002>
    </Analytical__Locations>
</Digital__Analytical__Twin>
```

Where "s12345.vms" may the filename of a linked XPS spectrum in IS014976 format, and "E98765.eds" is the filename of a linked EDS spectrum in a proprietary (SEM manufacturer's) format. The file "s31987.stl" contains the topography of the specimen as determined by photogrammetry in the DAT scanner.

CITATION LIST

[1] Céline Loussert Fonta and Bruno M Humbel Correlative microscopy, Archives of Biochemistry and Biophysics, Volume 581, 1 Sep. 2015, Pages 98-110.

[2] Jeffrey Caplan, Marc Niethammer, Russell M Taylor and Kirk J Czymmek, The power of correlative microscopy: multi-modal, multi-scale, multi-dimensional, Current Opinion in Structural Biology, Volume 21, Issue 5, October 2011, Pages 686-693.

[3] F Bergamasco et al, Image-Space Marker Detection and Recognition Using Projective Invariants, IEEE Conference Paper—June 2011, DOI: 10.1109/3DIMPVT.2011.55

[4] E. Olson, "AprilTag: a robust and flexible visual fiducial system," Robotics and Automation (ICRA), 2011 IEEE International Conference on. IEEE, 2011; M. Fiala, "ARTag, a fiducial marker system using digital techniques," Computer Vision and Pattern Recognition, 2005. CVPR 2005. IEEE Computer Society Conference on. Vol. 2. IEEE, 2005.

[5] Karl Kraus, "Photogrammetry: Geometry from Images and Laser Scans: 2nd Edition" (De Gruyter, Berlin, 2007)

[6] https://www.pix4d.com/product/pix4dmapper-photogrammetry-software

[7] AprilTag 2: Efficient and robust fiducial detection, Proceedings of the IEEE/RSJ International Conference on Intelligent Robots and Systems (IROS), John Wang and Edwin Olson, 2016

[8] AprilTag: A robust and flexible visual fiducial system, Proceedings of the IEEE International Conference on Robotics and Automation (ICRA), Edwin Olson
[9] https://www.agilent.com/en/service/laboratory-services/lab-operations-management/sample-processing-management
[10] https://www.thermofisher.com/order/catalog/product/INF-11000#/INF-11000
[11] ARTag Revision 1. A Fiducial Marker System Using Digital Techniques—Fiala, M., November 2004: https://www.cs.cmu.edu/afs/cs/project/skinnerbots/Wiki/AprilTags/NRC-47419.pdf
[12] "Correlative microscopy" by Cdline Loussert Fonta and Bruno M Humbel, Archives of Biochemistry and Biophysics, Volume 581, 1 Sep. 2015, Pages 98-110
[13] Computer-readable Image Markers for Automated Registration in Correlative Microscopy-"autoCRIM", J Sheriff, I W Fletcher, P J Cumpson, Ultramicroscopy, 113322 (2021).
[14] https://april.eecs.umich.edu/software/apriltag; also https://april.eecs.umich.edu/software/
[15] https://www.autoitscript.com/site/autoit/
[16] https://imagemagick.org/script/download.php
[17] https://github.com/geovens/glnk
[18] https://www.ibm.com/topics/what-is-a-digital-twin
[19] Grieves, Michael (Oct. 5, 2015). "Can the digital twin transform manufacturing". World Economic Forum Emerging Technologies. Retrieved Nov. 19, 2022.
[20] Elliotte Harold, XML in a nutshell, 3rd Edn (O'Reilly, North Sebastopol, CA, USA 2004).
[21] Jeffrey Caplan, Marc Niethammer, Russell M Taylor II, Kirk J Czymmek, The power of correlative microscopy: multi-modal, multi-scale, multi-dimensional, Current Opinion in Structural Biology 2011, 21:686-693
[22] The 2018 correlative microscopy techniques roadmap, Toshio Ando et al 2018 J. Phys. D: Appl. Phys. 51 443001.
[23] "Multi-modal analysis of 2D materials with the XPS-SEM CISA workflow", Thermo Scientific Applications Note
[24] J. J. H. A. Van Hest et al, Towards robust and versatile single nanoparticle fiducial markers for correlative light and electron microscopy, Journal of Microscopy, Vol. 274, Issue 1 2019, pp. 13-22 doi: 10.1111/jmi.12778
[25] Ströbel B, Schmelzle S, Blüthgen N, Heethoff M (2018) An automated device for the digitization and 3D modelling of insects, combining extended-depth-of-field and all-side multi-view imaging. ZooKeys 759: 1-27. https://doi.org/10.3897/zookeys.759.24584
[26] Plum F, Labonte D. 2021. scAnt—an open-source platform for the creation of 3D models of arthropods (and other small objects). PeerJ 9:e11155 DOI 10.7717/peerj.11155

I claim:

1. A scanning system comprising:

a processor; and a memory communicatively coupled to the processor, wherein the memory stores a plurality of processor-executable instructions which upon execution by the processor cause the processor to:

control at least one image capture device to capture a first plurality of images of a specimen and at least one fiducial marker, wherein the specimen is placed on a specimen holder and the at least one fiducial marker is associated with at least one of the specimen or the specimen holder;

generate a three-dimensional model (3D model) of the specimen based on an application of one or more photogrammetry techniques on the captured first plurality of images, wherein the one or more photogrammetry techniques captures information associated with a first coordinate system associated with the generated 3D model;

generate a data structure associated with the specimen based on the generated 3D model; and output the generated data structure comprising a first co-ordinate system associated with the generated 3D model, a second co-ordinate system associated with the specimen, and a corresponding relationship between the first co-ordinate system and the second co-ordinate system.

2. The scanning system of claim 1, wherein the processor is further configured to:

control a movement of the specimen holder to rotate from a first position to a second position;

control the at least one image capture device to capture a second plurality of images of the specimen and the at least one fiducial marker, wherein the specimen holder is in the second position; and generate the 3D model of the specimen further based on the application of the one or more photogrammetry techniques on the captured first plurality of images and the captured second plurality of images.

3. The scanning system according to claim 1, wherein the generated data structure corresponds to an extensible markup language (XML) file.

4. The scanning system of claim 1, wherein the at least one fiducial marker corresponds to one of: a quick response (QR) code, a barcode, an AprilTag, an ARtag, or an ArUco marker.

5. The scanning system of claim 1, wherein the processor is further configured to generate the second co-ordinate system associated with the specimen based on the at least one fiducial marker.

6. The scanning system of claim 5, wherein the generated data structure includes information associated with a first region of interest (RoI) of the specimen to be analyzed using a first analytical instrument integrated within the scanning system or using a second analytical instrument having a different co-ordinate system from the first analytical instrument.

7. The scanning system of claim 1, wherein the processor is further configured to:

receive a first user input associated with a marking of at least one point of interest on the generated 3D model;

store information associated with the marking of the at least one point of interest in the generated data structure based on the reception of the first user input; and output the generated data structure.

8. The scanning system of claim 7, where the at least one point of interest is marked for an analysis under one or more analytical instruments.

9. The scanning system of claim 1, wherein the specimen corresponds to a heterogeneous specimen.

10. A method comprising:

rendering a first image of a region of interest (RoI) of a specimen on a first analytical instrument, wherein the rendered first image includes at least one fiducial marker and is captured by the first analytical instrument;

receiving, from the first analytical instrument, a second user input associated with a selection of a point of interest within the rendered first image;

determining position information associated with the selected point of interest based on the reception of the second user input, wherein the determined position information comprises a position of the selected point of interest relative to the at least one fiducial marker;

storing the determined position information in a data structure;

receiving a third user input associated with rendering of a second image of the region of interest on a second analytical instrument, wherein the second analytical instrument is different from the first analytical instrument;

controlling the second analytical instrument to scan the stored data structure for determining a position of the at least one fiducial marker in the second image based on the received third user input;

applying at least one transformation technique on the position information stored in data structure based on the scanning; and rendering the first image of the selected point of interest on the second analytical instrument based on the application of the at least one transformation technique.

11. The method of claim 10, wherein the first image of the selected point of interest is captured by the second analytical instrument.

12. The method of claim 10, wherein the applied at least one transformation technique comprises an affine transformation technique.

13. The method of claim 10, further comprising:

scanning the rendered first image to determine a first position of the at least one fiducial markers within the rendered first image; and determining position information associated with the selected point of interest based on the scanning of the first image.

14. The method of claim 10, further comprising:

receiving a fourth user input associated with the selected point of interest, wherein the received fourth user input includes a first label and first information associated with the selected point of interest; and storing the first label and the first information associated with the selected point of interest in the data structure based on the received fourth user input.

15. The method of claim 10, wherein the data structure corresponds to a digital analytical twin (DAT) data structure associated with the specimen and is a digital replica of the specimen.

16. The method of claim 10, wherein the specimen corresponds to a heterogeneous specimen.

17. The method of claim 10, wherein the fiducial marker corresponds to one of a quick response (QR) code, a barcode, an AprilTag, an ARtag, or an ArUco marker.

18. A method comprising:

controlling at least one image capture device to capture a first plurality of images of a specimen and at least one fiducial marker, wherein the specimen is placed on a specimen holder and the at least one fiducial marker is associated with at least one of the specimen or the specimen holder;

generating a three-dimensional model (3D model) of the specimen based on an application of one or more photogrammetry techniques on the captured first plurality of images, wherein the one or more photogrammetry techniques captures information associated with a first coordinate system associated with the generated 3D model;

generating a data structure associated with the specimen based on the generated 3D model; and outputting the generated data structure comprising a first co-ordinate system associated with the generated 3D model, a second co-ordinate system associated with the specimen, and a corresponding relationship between the first co-ordinate system and the second co-ordinate system.

19. The method of claim 18, further comprising:

controlling a movement of the specimen holder to rotate from a first position to a second position, wherein the specimen is placed on the specimen holder;

controlling the at least one image capture device to capture a second plurality of images of the specimen and at least one fiducial marker, wherein the specimen holder is in the second position; and generating the 3D model of the specimen further based on the application of one or more photogrammetry techniques on the captured first plurality of images and the captured second plurality of images.

20. The method of claim 18, wherein the fiducial marker corresponds to one of a quick response (QR) code, a barcode, an AprilTag, an ARtag, or an ArUco marker.

* * * * *